(12) United States Patent
Taniguchi et al.

(10) Patent No.: US 8,021,470 B2
(45) Date of Patent: Sep. 20, 2011

(54) WATER-BASED INK FOR INK-JET RECORDING, INK CARTRIDGE AND INK-JET RECORDING APPARATUS

(75) Inventors: Akihiko Taniguchi, Kakamigahara (JP); Satoshi Okuda, Kiyosu (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 315 days.

(21) Appl. No.: 12/342,940

(22) Filed: Dec. 23, 2008

(65) Prior Publication Data

US 2009/0165673 A1    Jul. 2, 2009

(30) Foreign Application Priority Data

Dec. 28, 2007 (JP) ................... 2007-338537
Dec. 28, 2007 (JP) ................... 2007-338541
Dec. 28, 2007 (JP) ................... 2007-338542

(51) Int. Cl.
C09D 11/02 (2006.01)
B41J 2/01 (2006.01)

(52) U.S. Cl. ............... 106/31.48; 106/31.58; 106/31.59; 347/100

(58) Field of Classification Search ............... 106/31.48, 106/31.58, 31.59; 347/100
See application file for complete search history.

(56) References Cited

U.S. PATENT DOCUMENTS 5,560,771 A    10/1996 Takemoto et al.
(Continued)

FOREIGN PATENT DOCUMENTS

JP    07-278478    10/1995
(Continued)

*Primary Examiner* — Helene Klemanski
(74) *Attorney, Agent, or Firm* — Banner & Witcoff, Ltd.

(57) ABSTRACT

A water-based ink includes a dye (1) represented by the general formula (1); a dye (2) at least one dye selected from the group consisting of a dye having free acid that is represented by the general formula (2-1), C. I. Acid Red 52 and 289; DPP; and a surfactant represented by the general formula (3). The dyes, DPP, and the surfactant are blended so as to satisfy the conditions (A) to (D).

(A) a total amount of the dye (1) and (2) relative to a total amount of the ink is about 2 wt % to 5 wt %
(B) weight ratio between the dye (1) and (2) in the ink is about 9:1 to 7:3
(C) an amount of the surfactant relative to a total amount of the ink is about 0.5 wt % to 2.5 wt %
(D) an amount of DPP relative to a total amount of the ink is about 1 wt % to 3 wt %

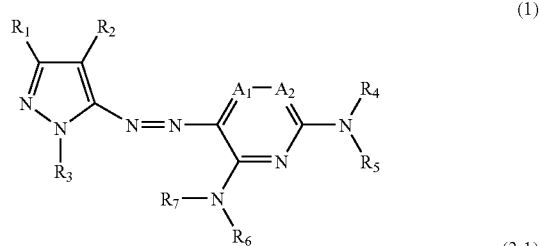

(1)

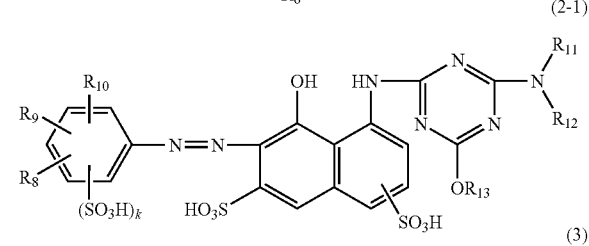

(2-1)

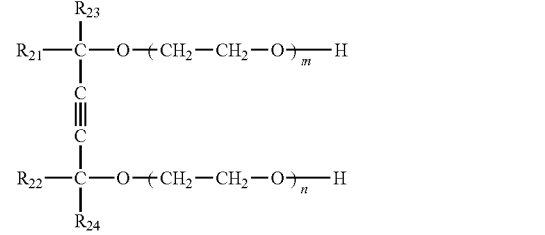

(3)

9 Claims, 4 Drawing Sheets

U.S. PATENT DOCUMENTS

| | | |
|---|---|---|
| 5,599,386 A | 2/1997 | Sano et al. |
| 5,609,673 A | 3/1997 | Takimoto et al. |
| 5,952,414 A | 9/1999 | Noguchi et al. |
| 6,596,067 B2 | 7/2003 | Menzel et al. |
| 7,108,743 B2 | 9/2006 | Fujiwara et al. |
| 7,109,336 B2 | 9/2006 | Fujiwara et al. |
| 7,201,477 B2 | 4/2007 | Taguchi et al. |
| 7,465,345 B2 * | 12/2008 | Okuda et al. ............... 106/31.28 |
| 7,713,343 B2 * | 5/2010 | Goto et al. ................. 106/31.48 |
| 7,727,321 B2 * | 6/2010 | Goto et al. ................. 106/31.48 |
| 7,736,424 B2 * | 6/2010 | Hamajima et al. ......... 106/31.48 |
| 7,736,425 B2 * | 6/2010 | Kato et al. ................. 106/31.48 |
| 2006/0009357 A1 | 1/2006 | Fujiwara et al. |
| 2007/0173641 A1 | 7/2007 | Fujiwara et al. |
| 2007/0186806 A1 | 8/2007 | Goto et al. |
| 2007/0186807 A1 | 8/2007 | Goto et al. |
| 2007/0188573 A1 * | 8/2007 | Hamajima et al. ......... 106/31.48 |
| 2007/0188574 A1 * | 8/2007 | Kato et al. ................. 106/31.48 |
| 2008/0302270 A1 * | 12/2008 | Taniguchi et al. ......... 106/31.45 |
| 2009/0165671 A1 | 7/2009 | Okuda et al. |
| 2009/0167831 A1 * | 7/2009 | Okuda et al. ............... 106/31.48 |

FOREIGN PATENT DOCUMENTS

| | | |
|---|---|---|
| JP | 08-073791 | 3/1996 |
| JP | 08-311375 | 11/1996 |
| JP | 09-111165 | 4/1997 |
| JP | 09-137099 | 5/1997 |
| JP | 09-202043 | 8/1997 |
| JP | 09-235484 | 9/1997 |
| JP | 09-241555 | 9/1997 |
| JP | 2000-154344 | 6/2000 |
| JP | 2000-265099 | 9/2000 |
| JP | 2002-053765 | 2/2002 |
| JP | 2002-212476 | 7/2002 |
| JP | 2002-371079 | 12/2002 |
| JP | 2002-371214 | 12/2002 |
| JP | 2003-231823 | 8/2003 |
| JP | 2006-143989 | 6/2006 |
| JP | 2007-217523 | 8/2007 |
| JP | 2007-217524 | 8/2007 |
| JP | 2007-217525 | 8/2007 |
| JP | 2007-217531 | 8/2007 |
| JP | 2009155600 A | 7/2009 |
| JP | 2009155605 A | 7/2009 |

* cited by examiner

WATER-BASED INK FOR INK-JET RECORDING, INK CARTRIDGE AND INK-JET RECORDING APPARATUS

CROSS-REFERENCE TO RELATED APPLICATION

This application claims priority from Japanese Patent Application Nos. 2007-338537, 2007-338541 and 2007-338542 filed on Dec. 28, 2007. The entire subject matter of the Japanese Patent Applications is incorporated herein by reference.

BACKGROUND

Conventionally, as an ink for ink-jet recording, an ink is known that comprises a dye, dipropylene glycol propyl ether, an acetylene glycol surfactant, and the like. The ink is required to be (i) good in color development, (ii) good in ejection stability in prolonged use, (iii) good in printing quality, (iv) preventing compound derived from material that forms an ink-jet recording apparatus from being eluted into the ink, and (v) good in toughness such as light resistance and ozone resistance of recording material. However, there were no conventional inks that satisfy all of the aforementioned performances. Examples of the material that forms the ink-jet recording apparatus include a rubber member and an organic material member other than rubber material. Examples of the rubber member include a wiper and a cap. The wiper wipes a nozzle surface of an ink-jet head, for example. The cap blocks off the nozzle surface from the outside world, for example. When a compound derived from the rubber member is eluted into the ink, there is a possibility that the compound is deposited in the ink. When the compound is deposited, for example, a nozzle of the ink-jet head may be clogged.

SUMMARY

A water-based ink for ink-jet recording comprises a coloring agent, water, a water-soluble organic solvent, and an acetylene glycol surfactant. The coloring agent comprises dye (1) and dye (2), the water-soluble organic solvent comprises dipropylene glycol propyl ether, and the acetylene glycol surfactant comprises a surfactant represented by the following general formula (3). The dye (1), the dye (2), the dipropylene glycol propyl ether and the surfactant represented by the following general formula (3) are blended so as to satisfy the following conditions (A) to (D), respectively.

Dye (1): dye represented by the following general formula (1)

Dye (2): at least one dye selected from the group consisting of a dye having free acid that is represented by the following general formula (2-1), C. I. Acid Red 52, and C. I. Acid Red 289

(A) a total amount of the dye (1) and the dye (2) relative to a total amount of the ink is in the range of about 2 wt % to about 5 wt %

(B) a weight ratio between the dye (1) and the dye (2) in the ink is in the range of about 9:1 to about 7:3

(C) an amount of surfactant represented by general formula (3) relative to a total amount of the ink is in the range of about 0.5 wt % to about 2.5 wt %

(D) an amount of dipropylene glycol propyl ether relative to a total amount of the ink is in the range of about 1 wt % to about 3 wt %

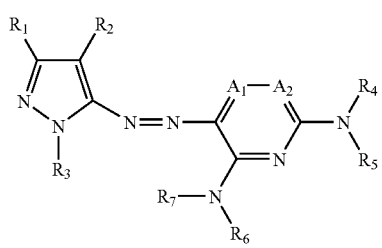

wherein in the general formula (1), $R_1$ represents a hydrogen atom, a substituted or unsubstituted alkyl group, or a substituted or unsubstituted aryl group;

$R_2$ represents a hydrogen atom, a halogen atom, or a cyano group;

$R_3$ represents a hydrogen atom, a substituted or unsubstituted alkyl group, a substituted or unsubstituted aryl group, or a substituted or unsubstituted heterocyclic group;

$R_4$, $R_5$, $R_6$ and $R_7$, each independently, represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, provided that $R_4$, $R_5$, $R_6$, and $R_7$ may be the same or different, that $R_4$ and $R_5$ are not simultaneously hydrogen atoms, and that $R_6$ and $R_7$ are not simultaneously hydrogen atoms; and $A_1$ and $A_2$ are both substituted or unsubstituted carbon atoms, or one of $A_1$ and $A_2$ is a substituted or unsubstituted carbon atom and the other is a nitrogen atom.

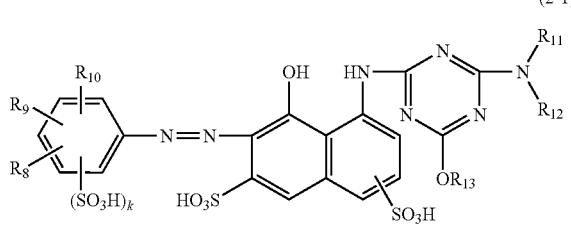

wherein in the general formula (2-1), $R_8$, $R_9$ and $R_{10}$, each independently, represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonate ester group, a substituted or unsubstituted alkylsulfonyl group, a substituted or unsubstituted arylsulfonyl group, a carboxyl group, or a carboxylate ester group, provided that $R_8$, $R_9$, and $R_{10}$ may be the same or different;

k represents a number of 0, 1 or 2;

$R_{11}$, $R_{12}$ and $R_{13}$, each independently, represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group, provided that $R_{11}$, $R_{12}$, and $R_{13}$ may be the same or different.

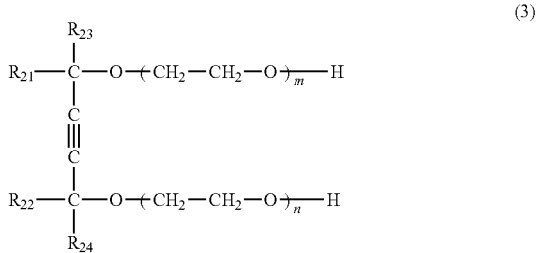

(3)

wherein in the general formula (3), m and n may be the same or different and indicate numbers that satisfy m+n=1 to 15; and $R_{21}$, $R_{22}$, $R_{23}$, and $R_{24}$ may be the same or different and are straight chain or branched-chain alkyl groups having 1 to 5 carbon atoms.

An ink cartridge comprises the water-based ink for ink-jet recording.

An ink-jet recording apparatus comprises the ink cartridge and an ink ejection unit. The water-based ink for ink-jet recording comprised in the ink cartridge is ejected from the ink ejection unit.

DETAILED DESCRIPTION

Figure 1:
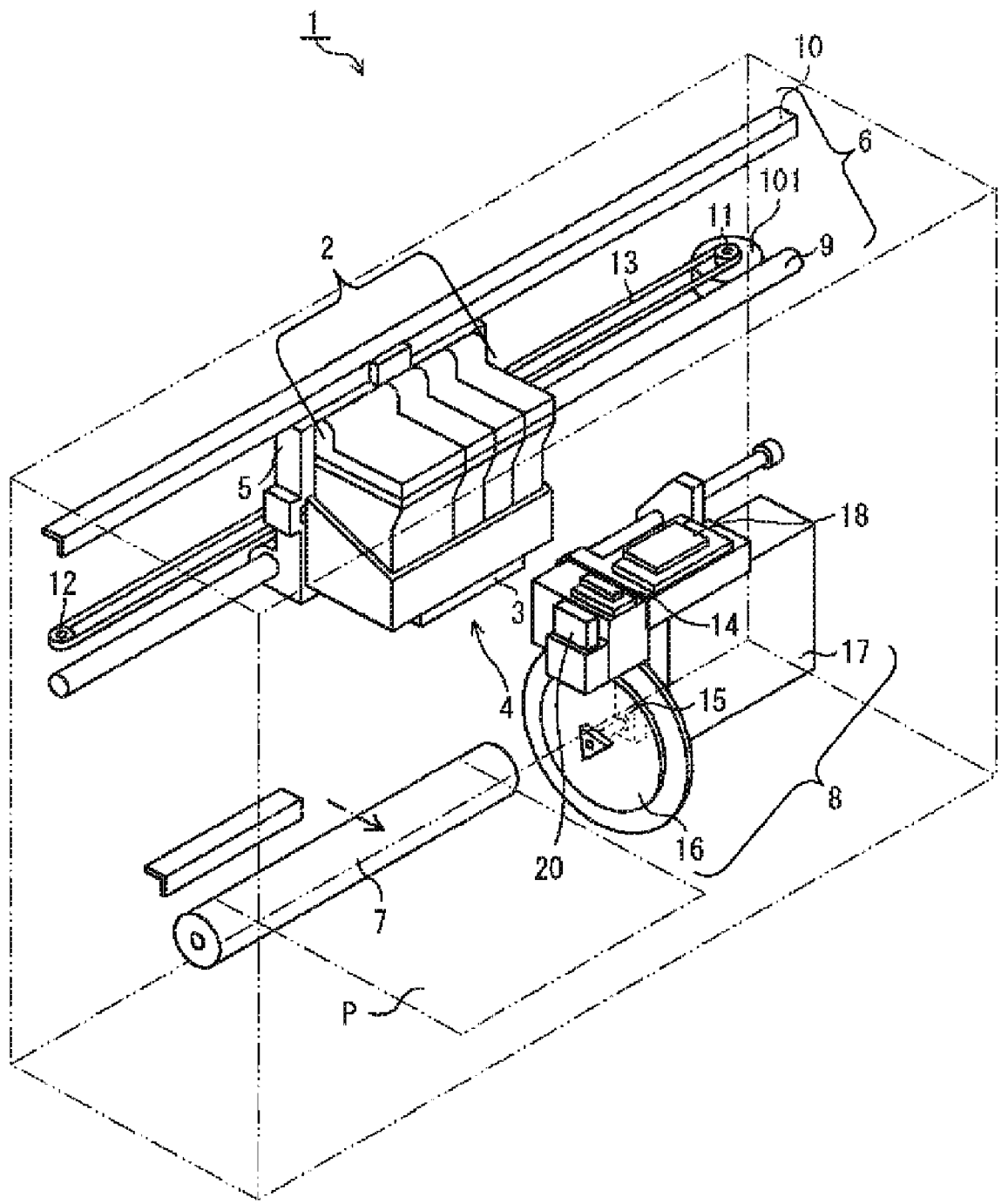
FIG. 1 is a schematic perspective view showing a construction of an example of an ink-jet recording apparatus.

With respect to the water-based ink for ink-jet recording, further, the dipropylene glycol propyl ether and the surfactant represented by the general formula (3) may be blended so as to satisfy the following condition (E), respectively.

$$y \geq -2x+3 \text{ and } y \leq -2x+6 \quad (E)$$

x: an amount of surfactant represented by general formula (3) relative to a total amount of the ink (wt %)

y: an amount of dipropylene glycol propyl ether relative to a total amount of the ink (wt %)

The x and y may strictly satisfy the condition (E) or may be placed at neighborhood of the straight line of y=−2x+3 in y<−2x+3 and the straight line of y=−2x+6 in y>−2x+6.

Application of the water-based ink for ink-jet recording is not particularly limited and, for example, may be used as a water-based magenta ink.

Next, the water-based ink for ink-jet recording (hereinafter, also may be referred to as "water-based ink" or "ink") is explained. The water-based ink for ink-jet recording comprises a coloring agent, water, a water-soluble organic solvent, and an acetylene glycol surfactant. As described above, the coloring agent comprises the dye (1) and the dye (2).

As described above, the dye (1) is a dye represented by the general formula (1).

As has been described, in the general formula (1), $R_1$ represents a hydrogen atom, a substituted or unsubstituted alkyl group, or a substituted or unsubstituted aryl group; $R_2$ represents a hydrogen atom, a halogen atom, or a cyano group; $R_3$ represents a hydrogen atom, a substituted or unsubstituted alkyl group, a substituted or unsubstituted aryl group, or a substituted or unsubstituted heterocyclic group; $R_4$, $R_5$, $R_6$ and $R_7$, each independently, represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, provided that $R_4$, $R_5$, $R_6$, and $R_7$ may be the same or different, and that $R_4$ and $R_5$ are not simultaneously hydrogen atoms and that $R_6$ and $R_7$ are not simultaneously hydrogen atoms; and $A_1$ and $A_2$ are both substituted or unsubstituted carbon atoms, or one of $A_1$ and $A_2$ is a substituted or unsubstituted carbon atom and the other is a nitrogen atom.

In the general formula (1), the substituted or unsubstituted alkyl group may be an alkyl group having 1 to 6 carbon atoms. Examples of the substituted or unsubstituted alkyl group include a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group and the like. Examples of the substituent of the substituted alkyl group include a hydroxyl group, an alkoxy group such as a methoxy group, an ethoxy group and the like; a cyano group; a halogen atom such as a fluorine atom, a chlorine atom, a bromine atom, an iodine atom and the like; and an ionic hydrophilic group such as a carboxylate, a sulfonate and the like.

In the general formula (1), the substituted or unsubstituted aryl group may be an aryl group having 6 to 12 carbon atoms. However, in the case of the substituted aryl group, the number of carbon atom does not include the number of carbon atom of the substituent. Examples of the substituted or unsubstituted aryl group include a phenyl group, a naphthyl group, a p-tolyl group, a p-octylphenyl group, a mesityl group, a p-methoxyphenyl group, an o-chlorophenyl group, an m-(3-sulfopropylamino)phenyl group and the like. Examples of the substituent of the substituted aryl group include an alkyl group such as a methyl group, an ethyl group, an isopropyl group, a tert-butyl group, an n-octyl group and the like; an alkoxy group (see above); a halogen atom (see above); an alkylamino group such as a methylamino group, a dimethylamino group and the like; an amide group; a carbamoyl group; a sulfamoyl group; a sulfoamide group; a hydroxyl group; an ester group such as a methoxycarbonyl group, an ethoxycarbonyl group and the like; and an ionic hydrophilic group (see above).

In the general formula (1), examples of the halogen atom include a fluorine atom, a chlorine atom, a bromine atom, an iodine atom and the like.

In the general formula (1), the substituted or unsubstituted heterocyclic group may be a heterocyclic group having a 5-ring or 6-ring. Examples of the substituted or unsubstituted heterocyclic group include a 2-pyridyl group, a 2-thienyl group, a 2-thiazolyl group, a 2-benzothiazolyl group, a 2-furyl group, a 6-sulfobenzothiazolyl group, a 6-sulfonate benzothiazolyl group and the like. Examples of the substituent of the substituted heterocyclic group include an amide group, a carbamoyl group, a sulfamoyl group, a sulfoamide group, a hydroxyl group, an ester group (see above), an ionic hydrophilic group (see above) and the like.

In the general formula (1), examples of the substituted or unsubstituted sulfonyl group include a methylsulfonyl group, a phenylsulfonyl group and the like. Examples of the substituent of a substituted sulfonyl group include the substituted or unsubstituted alkyl group (see above), a substituted or unsubstituted aryl group (see above) and the like.

In the general formula (1), the substituted or unsubstituted acyl group may be an acyl group having 1 to 12 carbon atoms. However, in the case of the substituted acyl group, the number of carbon atom does not include the number of carbon atom of the substituent. Examples of the substituted or unsubstituted acyl group include an acetyl group, a benzoyl group, a chloroacetyl group and the like. Examples of the substituent of the substituted acyl group include an ionic hydrophilic group (see above) and the like.

As has been described, in the general formula (1), $A_1$ and $A_2$ are both substituted or unsubstituted carbon atoms, or one of $A_1$ and $A_2$ is a substituted or unsubstituted carbon atom and the other is a nitrogen atom. $A_1$ and $A_2$ may be both substituted or unsubstituted carbon atoms because better performance may be obtained. Examples of the substituent bonded to the carbon atoms $A_1$ and $A_2$ include an alkyl group having 1 to 3 carbon atoms, a carboxyl group, a carbamoyl group, a cyano group and the like.

As has been described, in the general formula (1), $R_4$ and $R_5$ are not simultaneously hydrogen atoms, and also $R_6$ and $R_7$ are not simultaneously hydrogen atoms. Moreover, in the general formula (1), when the number of substituents of sulfonic acid group or carboxyl group is large, the water solubility of the dye tends to be improved. Therefore, the number of these substituents may be adjusted in accordance with need.

One embodiment of the dye (1) is, in the general formula (1), in a state where $R_1$ is an alkyl group; $R_2$ is a cyano group; $R_3$ is a hydrogen atom, or a substituted or unsubstituted heterocyclic group; $R_4$ is a hydrogen atom, a substituted or unsubstituted heterocyclic group, or a substituted aryl group; $R_5$ and $R_6$ are, each independently, a substituted heterocyclic group, or a substituted aryl group; $R_7$ is a hydrogen atom; $A_1$ is a substituted carbon atom; and $A_2$ is a substituted or unsubstituted carbon atom.

A further embodiment of the dye (1) is, in the general formula (1), in a state where $R_1$ is a tert-butyl group; $R_2$ is a cyano group; $R_3$ is a hydrogen atom, or a benzothiazolyl group optionally substituted by a sulfonic acid group or an alkali metal sulfonate group (preferably a benzothiazole-2-yl group); $R_4$ is a hydrogen atom, a benzothiazolyl group optionally substituted by a sulfonic acid group or an alkali metal sulfonate group (preferably a benzothiazole-2-yl group), or a trialkylphenyl group substituted by a sulfonic acid group or an alkali metal sulfonate group (preferably a mesityl group); $R_5$ and $R_6$ are, each independently, a monoalkylphenyl group, a dialkylphenyl group, or a trialkylphenyl group optionally substituted by a sulfonic acid group or an alkali metal sulfonate group (preferably a p-octylphenyl or mesityl group), or a benzothiazolyl group substituted by a sulfonic acid group or an alkali metal sulfonate group (preferably a benzothiazole-2-yl group); $R_7$ is a hydrogen atom; $A_1$ is a carbon atom substituted by an alkyl group (preferably a methyl group); and $A_2$ is a carbon atom optionally substituted by a cyano group.

Examples of the dye (1) comprise compounds represented by chemical formulae (1-A) to (1-F) below.

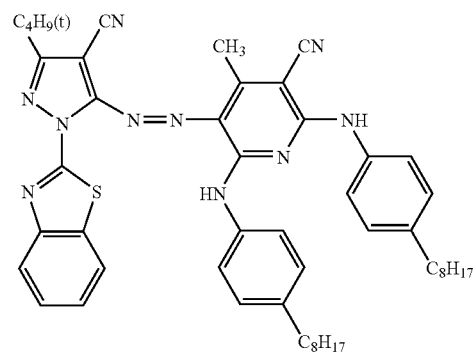

(1-A)

The compound represented by the chemical formula (1-A) is an embodiment of the dye (1), wherein, in the general formula (1), $R_1$ is a tert-butyl group; $R_2$ is a cyano group; $R_3$ is a benzothiazole-2-yl group; $R_4$ is a hydrogen atom; $R_5$ and $R_6$ are each a p-octylphenyl group; $R_7$ is a hydrogen atom; $A_1$ is a carbon atom substituted by a methyl group; and $A_2$ is a carbon atom substituted by a cyano group.

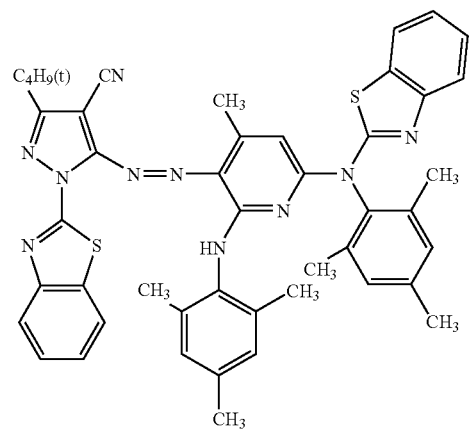

(1-B)

The compound represented by the chemical formula (1-B) is another embodiment of the dye (1), wherein, in the general formula (1), $R_1$ is a tert-butyl group; $R_2$ is a cyano group; $R_3$ and $R_4$ are each a benzothiazole-2-yl group; $R_5$ and $R_6$ are each a mesityl group; $R_7$ is a hydrogen atom; $A_1$ is a carbon atom substituted by a methyl group; and $A_2$ is a carbon atom.

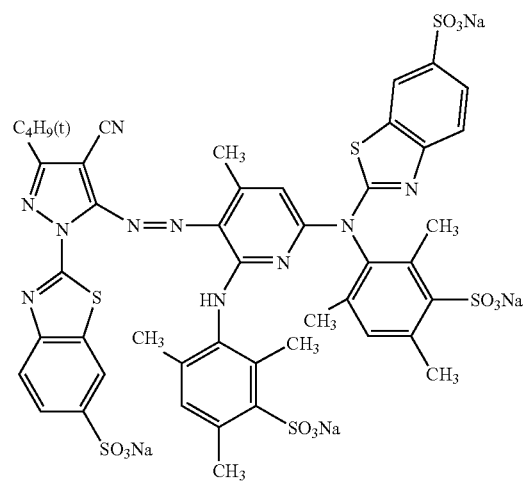

(1-c)

The compound represented by the chemical formula (1-C) is yet another embodiment of the dye (1), wherein, in the general formula (1), $R_1$ is a tert-butyl group; $R_2$ is a cyano group; $R_3$ and $R_4$ are each a 6-sodium sulfonate benzothiazole-2-yl group; $R_5$ and $R_6$ are each a 3-sodium sulfonate mesityl group; $R_7$ is a hydrogen atom; $A_1$ is a carbon atom substituted by a methyl group; and $A_2$ is a carbon atom.

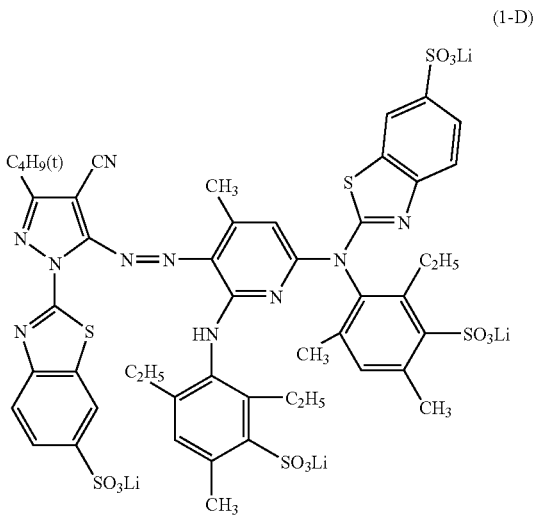

(1-D)

The compound represented by the chemical formula (1-D) is yet another embodiment of the dye (1), wherein, in the general formula (1), $R_1$ is a tert-butyl group; $R_2$ is a cyano group; $R_3$ and $R_4$ are each a 6-lithium sulfonate benzothiazole-2-yl group; $R_5$ and $R_6$ are each a 2,6-diethyl-4-methyl-3-sulfo lithium salt phenyl group; $R_7$ is a hydrogen atom; $A_1$ is a carbon atom substituted by a methyl group; and $A_2$ is a carbon atom.

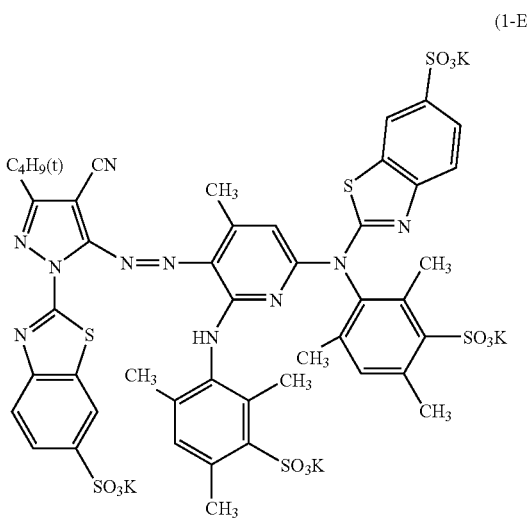

(1-E)

The compound represented by chemical formula (1-E) is yet another embodiment of the dye (1), wherein, in the general formula (1), $R_1$ is a tert-butyl group; $R_2$ is a cyano group; $R_3$ and $R_4$ are each a 6-potassium sulfonate benzothiazole-2-yl group; $R_5$ and $R_6$ are each a 3-potassium sulfonate mesityl group; $R_7$ is a hydrogen atom; $A_1$ is a carbon atom substituted by a methyl group; and $A_2$ is a carbon atom.

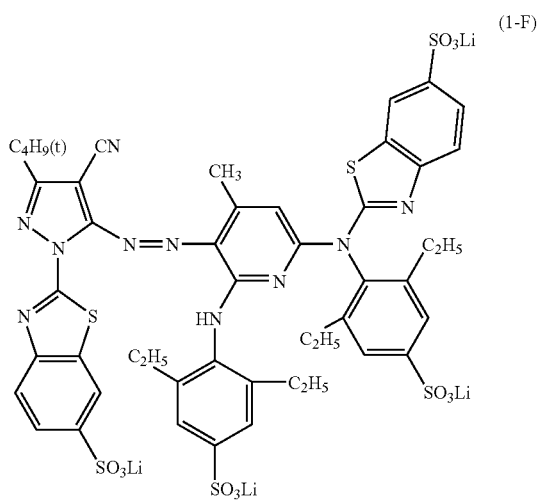

(1-F)

The compound represented by chemical formula (1-F) is yet another embodiment of the dye (1), wherein, in the general formula (1), $R_1$ is a tert-butyl group; $R_2$ is a cyano group; $R_3$ and $R_4$ are each a 6-lithium sulfonate benzothiazole-2-yl group; $R_5$ and $R_6$ are each a 2,6-diethyl-4-sulfo lithium salt phenyl group; $R_7$ is a hydrogen atom; $A_1$ is a carbon atom substituted by a methyl group; and $A_2$ is a carbon atom.

An amount of the dye (1) is not particularly limited as long as it satisfies the conditions (A) and (B). Inclusion of the dye (1) in the water-based ink makes it possible to improve toughness of recording material recorded using the water-based ink. The amount of the dye (1) relative to the total amount of the ink is, for example, in the range of about 1.4 wt % to about 4.5 wt %, and in the range of about 1.75 wt % to about 4.05 wt %.

As described above, the dye (2) is at least one dye selected from the group consisting of a dye having free acid that is represented by the general formula (2-1), C. I. Acid Red 52, and C. I. Acid Red 289.

First, the dye having free acid that is represented by the general formula (2-1) is explained. As has been described, in the general formula (2-1), $R_8$, $R_9$ and $R_{10}$, each independently, represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonate ester group, a substituted or unsubstituted alkylsulfonyl group, a substituted or unsubstituted arylsulfonyl group, a carboxyl group, or a carboxylate ester group, provided that $R_8$, $R_9$, and $R_{10}$ may be the same or different; k represents a number of 0, 1 or 2; $R_{11}$, $R_{12}$ and $R_{13}$, each independently, represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group, provided that $R_{11}$, $R_{12}$, and $R_{13}$ may be the same or different.

In the general formula (2-1), examples of the substituted or unsubstituted alkyl group of $R_8$, $R_9$ and $R_{10}$ include an alkyl group having 1 to 9 carbon atoms in total. Examples of a substituted or unsubstituted alkyl group include a methyl group, an ethyl group, an n-propyl group, an isopropyl group, an n-butyl group, a trifluoromethyl group, a dimethylaminomethyl group and the like. Examples of the substituent of the substituted alkyl group include the substituents described for general formula (1) of the dye (1).

In the general formula (2-1), examples of the substituted or unsubstituted alkoxy group of $R_8$, $R_9$ and $R_{10}$ include an alkoxy group having 1 to 9 carbon atoms in total. Examples of a substituted or unsubstituted alkoxy group include a methoxy group, an isopropoxy group, an n-butoxy group and the like.

In the general formula (2-1), examples of the halogen atom of $R_8$, $R_9$ and $R_{10}$ include a fluorine atom, a chlorine atom, a bromine atom, an iodine atom and the like.

In the general formula (2-1), examples of the substituted or unsubstituted carbamoyl group of $R_8$, $R_9$ and $R_{10}$ include a carbamoyl group, an N,N-dimethylcarbamoyl group, a phenylcarbamoyl group and the like.

In the general formula (2-1), examples of the substituted or unsubstituted sulfamoyl group of $R_8$, $R_9$ and $R_{10}$ include a sulfamoyl group, an N-methylsulfamoyl group, an N-ethylsulfamoyl group, an N-ethyl-N-phenylsulfamoyl group, an N,N-dimethylsulfamoyl group, a p-carboxyphenylsulfamoyl group and the like.

In the general formula (2-1), examples of the substituted or unsubstituted amino group of $R_8$, $R_9$ and $R_{10}$ include an N-methylamino group, a carbamoylamino group, an N,N-diethylamino group, an acetylamino group and the like.

In the general formula (2-1), examples of the sulfonate ester group of $R_8$, $R_9$ and $R_{10}$ include a phenoxysulfonyl group and the like.

In the general formula (2-1), examples of the substituted or unsubstituted alkylsulfonyl group of $R_8$, $R_9$ and $R_{10}$ include an alkylsulfonyl group having 1 to 9 carbon atoms in total. Examples of a substituted or unsubstituted alkylsulfonyl group include a hydroxyethylsulfonyl group and the like.

In the general formula (2-1), examples of the substituted or unsubstituted arylsulfonyl group of $R_8$, $R_9$ and $R_{10}$ include an arylsulfonyl group having 6 to 15 carbon atoms in total. Examples of a substituted or unsubstituted arylsulfonyl group include a benzylsulfonyl group and the like.

In the general formula (2-1), examples of the carboxylate ester group of $R_8$, $R_9$ and $R_{10}$ include a methoxycarboxyl group and the like.

In the general formula (2-1), examples of the substituted or unsubstituted alkyl group of $R_{11}$, $R_{12}$ and $R_{13}$ include an alkyl group having 1 to 18 carbon atoms in total. Examples of a substituted or unsubstituted alkyl group include an ethyl group, an n-butyl group, an n-octyl group, an ethylhexyl group, a hydroxyethyl group, a carboxypropyl group, a carboxycyclohexylmethyl group, a 1-carboxy-2-mercaptoethyl group, a 1-carboxy-2-carbamoyl-ethyl group, a 1-isopropyl-1-carboxymethyl group, a 1,2-dicarboxypropyl group and the like. Examples of the substituent of the substituted alkyl group include the substituents described for general formula (1) of the dye (1).

In the general formula (2-1), examples of the substituted or unsubstituted alkenyl group of $R_{11}$, $R_{12}$ and $R_{13}$ include an alkenyl group having 2 to 18 carbon atoms in total. Examples of a substituted or unsubstituted alkenyl group include a 2-methyl-1-propenyl group, a vinyl group, an allyl group and the like.

In the general formula (2-1), examples of the substituted or unsubstituted aryl group of $R_{11}$, $R_{12}$ and $R_{13}$ include a 3,4-dicarboxyphenyl group, a 4-butylphenyl group, a 4-carboxyphenyl group and the like. Examples of the substituent of the substituted aryl group include the substituents described for general formula (1) of the dye (1).

In the general formula (2-1), examples of the substituted or unsubstituted aralkyl group of $R_{11}$, $R_{12}$ and $R_{13}$ include a benzyl group, a 1-carboxy-2-phenyl-ethyl group, a 1-carboxy-2-hydroxyphenylethyl group, a 4-carboxybenzyl group and the like.

In the general formula (2-1), examples of the substituted or unsubstituted alicyclic group of $R_{11}$, $R_{12}$ and $R_{13}$ include a cyclohexyl group, a 4-carboxycyclohexyl group and the like.

In the general formula (2-1), examples of the substituted or unsubstituted heterocyclic group of $R_{11}$, $R_{12}$ and $R_{13}$ include a pyridyl group, a thiadiazolyl group, a benzothiazolyl group, a 2,2,6,6-tetramethylpiperidinyl group and the like. Examples of the substituent of the substituted heterocyclic group include the substituents described for general formula (1) of the dye (1).

In the general formula (2-1), at least one of $R_{11}$, $R_{12}$ and $R_{13}$ may be an alkyl, alkenyl, aryl, alicyclic, aralkyl or heterocyclic group substituted by one to four carboxyl or sulfamoyl groups.

In the general formula (2-1), $R_{11}$ and $R_{12}$ may be each independently a hydrogen atom or a tri-substituted phenyl group, provided that $R_{11}$ and $R_{12}$ may be the same or different. In this instance, the three substituents of the tri-substituted phenyl group are, each independently, a hydrogen atom, a halogen atom, a hydroxyl group, a substituted or unsubstituted alkyl group having 1 to 9 carbon atoms in total, a substituted or unsubstituted alkoxy group having 1 to 9 carbon atoms in total, a substituted or unsubstituted carbamoyl group, a substituted or unsubstituted sulfamoyl group, a substituted or unsubstituted amino group, a nitro group, a sulfonate ester group or a carboxylate ester group. The aforementioned three substituents may be the same or different.

One embodiment of the dye having free acid that is represented by the general formula (2-1) is, in the general formula (2-1), in a state where at least one of $R_{11}$, $R_{12}$ and $R_{13}$ is an alkyl, alkenyl, aryl, aralkyl or cyclohexyl group substituted by one to four carboxyl or sulfamoyl groups.

With respect to the dye having free acid that is represented by the general formula (2-1), sulfonic acid group, carboxyl group, or the total of these salts contained in its structure is six or less, five or less and four or less. Furthermore, the dye having free acid that is represented by the general formula (2-1) may be used in the free acid form. However, when the dye having free acid that is represented by the general formula (2-1) is obtained in a salt form during manufacturing, it may be used without conversion or may be converted into a desired salt form. Moreover, with respect to the dye having free acid that is represented by the general formula (2-1), a part of the acid groups may be in a salt form, and both a salt-form dye and a free acid-form dye may be present. Examples of a salt form include salts of alkali metals such as Na, Li, K and the like, ammonium salts optionally substituted by an alkyl group or a hydroxyalkyl group, and salts of organic amines. Examples of the organic amines include a lower alkylamine, a hydroxy-substituted lower alkylamine, a carboxy-substituted lower alkylamine, a polyamine having 2 to 10 alkyleneimine units each having 2 to 4 carbon atoms and the like. The number of the types of these salts used in not limited to 1, but a plurality of types of the salts may be present.

Another embodiment of the dye having free acid that is represented by the general formula (2-1) is, in a dye represented by the general formula (2-1), in a state where k is 0; $R_8$ is a carboxyl group, a carbamoyl group, a trifluoromethyl group or a sulfamoyl group; $R_9$ and $R_{10}$ are hydrogen atoms; $R_{11}$ is a phenyl group or a carboxyalkyl group optionally substituted by a carboxyl group or a sulfamoyl group; $R_{12}$ is a hydrogen atom; and $R_{13}$ is a hydrogen atom or an alkyl group.

Examples of the dye having free acid that is represented by the general formula (2-1) include compounds represented by the chemical formulae (2-1A) to (2-1E) below.

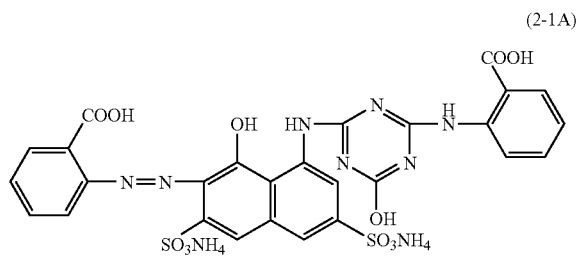
(2-1A)

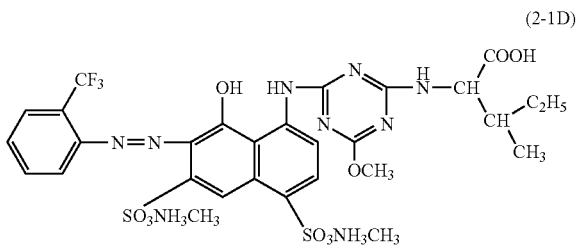
(2-1D)

The compound represented by the chemical formula (2-1A) is an embodiment of dye having free acid that is represented by the general formula (2-1), wherein, in the general formula (2-1), k is 0; $R_8$ is a carboxyl group at the 2-position of the phenyl group bonded to the azo group; $R_9$, $R_{10}$ and $R_{12}$ are hydrogen atoms; $R_{11}$ is a 2-carboxyphenyl group; and $R_{13}$ is a hydrogen atom. In the compound represented by the chemical formula (2-1A), sulfonic acid at the 3-position and 6-position of the naphthalene ring is an ammonium salt.

The compound represented by the chemical formula (2-1D) is still another embodiment of the dye having free acid that is represented by the general formula (2-1), wherein, in the general formula (2-1), k is 0; $R_8$ is a trifluoromethyl group at the 2-position of the phenyl group bonded to the azo group; $R_9$, $R_{10}$ and $R_{12}$ are hydrogen atoms; $R_{11}$ is a 1-carboxy-2-methylbutyl group; and $R_{13}$ is a methyl group. In the compound represented by the chemical formula (2-1D), sulfonic acid at the 3-position and 6-position of the naphthalene ring is a methylammonium salt.

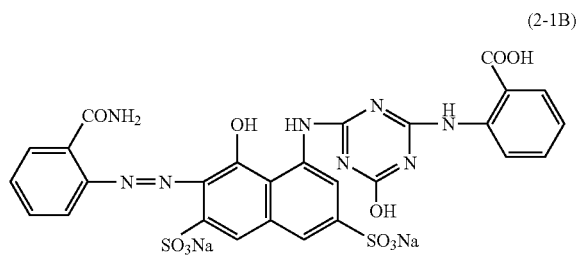
(2-1B)

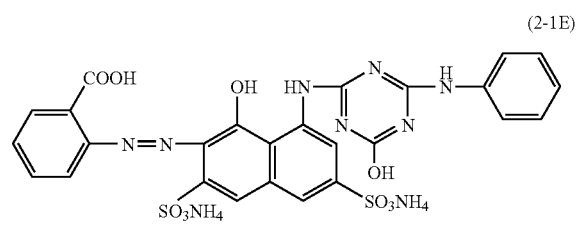
(2-1E)

The compound represented by the chemical formula (2-1B) is another embodiment of the dye having free acid that is represented by the general formula (2-1), wherein, in the general formula (2-1), k is 0; $R_8$ is a carbamoyl group at the 2-position of the phenyl group bonded to the azo group; $R_9$, $R_{10}$ and $R_{12}$ are hydrogen atoms; $R_{11}$ is a 2-carboxyphenyl group; and $R_{13}$ is a hydrogen atom. In the compound represented by the chemical formula (2-1B), sulfonic acid at the 3-position and 6-position of the naphthalene ring is a sodium salt.

The compound represented by the chemical formula (2-1E) is further another embodiment of the dye having free acid that is represented by the general formula (2-1), wherein, in the general formula (2-1), k is 0; $R_8$ is a carboxyl group at the 2-position of the phenyl group bonded to the azo group; $R_9$, $R_{10}$ and $R_{12}$ are hydrogen atoms; $R_1$ is a phenyl group; and $R_{13}$ is a hydrogen atom. In the compound represented by the chemical formula (2-1E), sulfonic acid at the 3-position and 6-position of the naphthalene ring is an ammonium salt.

Next, C. I. Acid Red 52 is explained. C. I. Acid Red 52 is a dye represented by, for example, the following chemical formula (2-2).

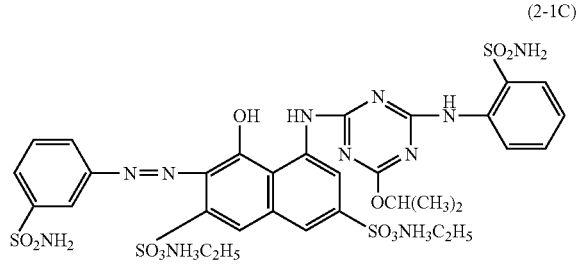
(2-1C)

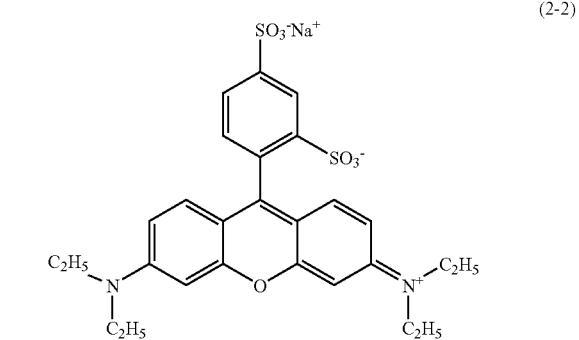
(2-2)

The compound represented by the chemical formula (2-1C) is yet another embodiment of the dye having free acid that is represented by the general formula (2-1), wherein, in the general formula (2-1), k is 0; $R_8$ is a sulfamoyl group at the 3-position of the phenyl group bonded to the azo group; $R_9$, $R_{10}$ and $R_{12}$ are hydrogen atoms; $R_1$ is a 2-sulfamoylphenyl group; and $R_{13}$ is an isopropyl group. In the compound represented by the chemical formula (2-1C), sulfonic acid at the 3-position and 6-position of the naphthalene ring is an ethylammonium salt.

Next, C. I. Acid Red 289 is explained. C. I. Acid Red 289 is a dye represented by, for example, the following chemical formula (2-3).

(2-3)

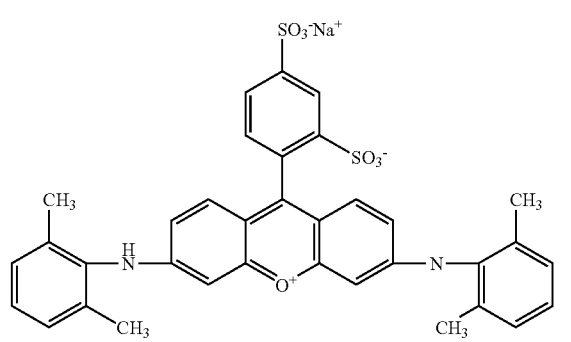

An amount of the dye (2) is not particularly limited as long as it satisfies the conditions (A) and (B). Inclusion of the dye (2) in the water-based ink makes it possible to obtain a water-based ink good in color development. The amount of the dye (2) relative to the total amount of the ink is, for example, in the range of about 0.2 wt % to about 1.5 wt %, and in the range of about 0.25 wt % to about 1.35 wt %.

As described above, the amount of the dye (1) and the dye (2) relative to the total amount of the ink is in the range of about 2 wt % to about 5 wt %. The amount may be in the range of about 2.5 wt % to about 4.5 wt %.

As described above, a weight ratio between the dye (1) and the dye (2) is in the range of about 9:1 to about 7:3.

The coloring agent may be composed of the dye (1) and the dye (2) only or may further comprise other dyes or pigments.

The water may be ion-exchange water or purified water. An amount of the water relative to the total amount of the ink is, for example, in the range of about 10 wt % to about 90 wt %, and in the range of about 40 wt % to about 80 wt %. The amount of the water may be a balance of the other components, for example.

The water-soluble organic solvent is classified into a humectant and a penetrant. The humectant prevents ink from drying at a tip of an ink-jet head, for example. The penetrant adjusts a drying rate of ink on a recording paper, for example.

The humectant is not limited. Examples of the humectant include lower alcohol such as methyl alcohol, ethyl alcohol, n-propyl alcohol, isopropyl alcohol, n-butyl alcohol, sec-butyl alcohol, tert-butyl alcohol and the like; amide such as dimethylformamide, dimethylacetamide and the like; ketone such as acetone and the like; ketoalcohol such as diacetone alcohol and the like; ether such as tetrahydrofuran, dioxane and the like; polyalcohol such as polyalkylene glycol, alkylene glycol, glycerin and the like; 2-pyrrolidone; N-methyl-2-pyrrolidone; 1,3-dimethyl-2-imidazolidinone; and the like. Examples of the polyalkylene glycol include, without limitation, polyethylene glycol, polypropylene glycol and the like. Examples of the alkylene glycol include, without limitation, ethylene glycol, propylene glycol, butylene glycol, diethylene glycol, triethylene glycol, dipropylene glycol, tripropylene glycol, thiodiglycol, hexylene glycol and the like. Among them, polyalcohol such as alkylene glycol and glycerin is preferable. One of the humectants may be used alone or two or more of them may be used in combination.

An amount of the humectant is not particularly limited. The amount of the humectant relative to the total amount of the ink is, for example, in the range of about 0 wt % to about 95 wt %, in the range of about 10 wt % to about 80 wt %, and in the range of about 10 wt % to about 50 wt %.

The water-based ink for ink-jet recording comprises dipropylene glycol propyl ether (DPP) as the penetrant. As described above, the amount of the DPP relative to the total amount of the ink is in the range of about 1 wt % to about 3 wt %, in the range of about 1.2 wt % to about 2.7 wt %.

The penetrant may be composed of the DPP only or further may comprise other penetrants as long as it does not undermine the advantage of the present invention.

The penetrant other than the DPP is not limited. Examples of the penetrant include ethylene glycol methyl ether, ethylene glycol ethyl ether, ethylene glycol propyl ether, diethylene glycol methyl ether, diethylene glycol ethyl ether, diethylene glycol propyl ether, diethylene glycol butyl ether, triethylene glycol methyl ether, triethylene glycol ethyl ether, triethylene glycol propyl ether, triethylene glycol butyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol butyl ether, tripropylene glycol methyl ether, tripropylene glycol ethyl ether, tripropylene glycol propyl ether, tripropylene glycol butyl ether and the like. One of the penetrants other than the DPP may be used alone or two or more of them may be used in combination.

As described above, the water-based ink for ink-jet recording comprises an acetylene glycol surfactant. The acetylene glycol surfactant comprises the surfactant represented by the general formula (3). In the general formula (3), the m and n may be the same or different. The m and n are the numbers that satisfy m+n=1 to 15, and m+n=3 to 11. $R_{21}$, $R_{22}$, $R_{23}$, and $R_{24}$ may be the same or different and are straight chain or branched-chain alkyl groups having 1 to 5 carbon atoms. The alkyl group includes, for example, a methyl group, an ethyl group, a propyl group, an isopropyl group, a butyl group and the like.

The surfactant represented by the general formula (3) may be a commercially available surfactant, for example. Examples of the commercially available surfactant include OLFIN® E1010, OLFIN® E1004, SURFYNOL® 440, and SURFYNOL® 465 manufactured by Nissin Chemical Industry Co., Ltd.; and ACETYRENOL® E40 and ACETYRENOL® E100 manufactured by Kawaken Fine Chemicals Co., Ltd.

As described above, the amount of the surfactant represented by the general formula (3) relative to the total amount of the ink is in the range of about 0.5 wt % to about 2.5 wt %, in the range of about 0.6 wt % to about 2 wt %.

The water-based ink for ink-jet recording may comprise surfactant other than the surfactant that is represented by the general formula (3) as long as it does not undermine the advantage of the present invention. The surfactant other than the surfactant that is represented by the general formula (3) is not limited. Examples of the surfactant include anionic surfactants manufactured by Kao Corporation such as EMAL® series, LATEMUL® series, VENOL® series, NEOPELEX® series, NS SOAP, KS SOAP, OS SOAP, PELEX® series and the like. Examples of the surfactant also include anionic surfactants manufactured by Lion Corporation such as LIPOLAN® series, LIPON® series, SUNNOL® series, LIPOTAC® series, ENAGICOL® series, LIPAL® series, LOTAT® series and the like. Furthermore, examples of the surfactant include nonionic surfactants manufactured by Kao Corporation such as EMULGEN® series, RHEODOL® series, EMASOL® series, EXCEL® series, EMANON® series, AMIET® series, AMINON® series and the like. Examples of the surfactant further include nonionic surfactants manufactured by Lion Corporation such as DOBANOX® series, LEOCOL® series, LEOX® series, LAOL® series, LEOCON® series, LIONOL® series, CADENAX® series, LIONON® series, LEOFAT® series and the like. One of the surfactants other than the surfactant that is represented by the general formula (3) may be used alone or two or more of them may be used in combination.

The water-based ink for ink-jet recording may further comprise a conventionally known additive as required. Examples of the additive include a viscosity modifier, a surface tension modifier, and an antifungal agent. Examples of the viscosity modifier include, without limitation, polyvinyl alcohol, cellulose, water-soluble resin and the like.

The water-based ink for ink-jet recording may be prepared, for example, by uniformly mixing the coloring agent, water, the water-soluble organic solvent, and the acetylene glycol surfactant with other added components as required by a conventionally known method, and then removing insolubles with a filter or the like.

As described above, with respect to the water-based ink for ink-jet recording, because the dipropylene glycol propyl ether and the surfactant represented by the general formula (3) are blended so as to satisfy the conditions of (C) and (D), it is good in ejection stability and printing quality as well as preventing compound derived from a rubber member and the like in an ink-jet recording apparatus from being eluted into the ink.

As described above, the water-based ink for ink-jet recording may be used as a water-based magenta ink. Further, the water-based ink for ink-jet recording may be used as a water-based ink other than a magenta color by further comprising coloring agents other than the dye (1) and the dye (2).

An ink cartridge comprising the water-based ink for ink-jet recording. As a body of the ink cartridge, for example, a conventionally known body may be used.

Next, an ink-jet recording apparatus is explained. The ink-jet recording apparatus comprises the ink cartridge and an ink ejection unit, and the water-based ink comprised in the ink cartridge is ejected from the ink ejection unit. Other than this, the ink-jet recording apparatus may have the construction similar to that of a conventionally known ink-jet recording apparatus.

FIG. 1 shows a construction of an example of the ink-jet recording apparatus. As shown in FIG. 1, the ink-jet recording apparatus 1 comprises four ink cartridges 2, an ink-jet head 3, a head unit 4, a carriage 5, a drive unit 6, a platen roller 7, and a purge unit 8 as main constructional elements. In the ink-jet recording apparatus 1 of this example, the ink-jet head 3 is the ink ejection unit.

The four ink cartridges 2 each comprise water-based inks of yellow, magenta, cyan, and black. For example, the water-based magenta ink is the water-based ink for ink-jet recording. The ink-jet head 3 performs printing on a recording material P such as a recording paper. The head unit 4 is provided with the ink-jet head 3. The four ink cartridges 2 and the head unit 4 are mounted to the carriage 5. The drive unit 6 reciprocates the carriage 5 in a straight line. The platen roller 7 extends in a reciprocating direction of the carriage 5 and opposes to the ink-jet head 3.

The drive unit 6 comprises a carriage shaft 9, a guide plate 10, a pair of pulleys 11 and 12, and an endless belt 13. The carriage shaft 9 is disposed at a lower end portion of the carriage 5 and extends in parallel to the platen roller 7. The guide plate 10 is disposed at an upper end portion of the carriage 5 and extends in parallel to the carriage shaft 9. The pulleys 11 and 12 are disposed in positions corresponding to both end portions of the carriage shaft 9 and between the carriage shaft 9 and the guide plate 10. The endless belt 13 is stretched between the pulleys 11 and 12.

In the ink-jet recording apparatus 1, as the pulley 11 is rotated in normal and reverse directions by the drive of a carriage motor 101, the carriage 5 which is connected to the endless belt 13 is reciprocated linearly along the carriage shaft 9 and the guide plate 10 in accordance with the rotation of the pulley 11.

The recording material P is fed from a paper feeding cassette (not shown) positioned on a side of or underneath the ink-jet recording apparatus 1. The recording material P is introduced between the ink-jet head 3 and the platen roller 7. Then, a predetermined printing is performed on the recording material P with the ink ejected from the ink-jet head 3. The recording material P then is discharged from the ink-jet recording apparatus 1. In FIG. 1, a feeding mechanism and a discharging mechanism of the recording material P are not shown.

The purge unit 8 is provided on a side of the platen roller 7. The purge unit 8 is disposed so as to oppose the ink-jet head 3 when the head unit 4 is in a reset position (above the purge unit 8 in this example). The purge unit 8 comprises a purge cap 14, a pump 15, a cam 16, and an ink reservoir 17. The purge cap 14 covers a plurality of nozzles (not shown) of the ink-jet head 3 when the head unit 4 is in a reset position. In this state, the pump 15 draws poor ink comprising, for example, air bubbles trapped inside the ink-jet head 3, by being driven by the cam 16. Thereby a recovery of the ink-jet head 3 is promoted. The drawn poor ink is stored in the ink reservoir 17.

A wiper member 20 is provided on the side of the platen roller 7 in the purge unit 8. The wiper member 20 has a spatula shape, and wipes a nozzle surface of the ink-jet head 3 in accordance with the movement of the carriage 5. In FIG. 1, in order to prevent the ink from drying, a cap 18 covers the plurality of nozzles of the ink-jet head 3 that returns to the reset position after the completion of printing.

With respect to the ink-jet recording apparatus 1 of this example, the four ink cartridges 2 are mounted to one carriage 5. With respect to the ink-jet recording apparatus, the four ink cartridges may be mounted to a plurality of carriages. Further, the four ink cartridges may not be mounted to the carriage, but may be provided and fixed in the ink-jet recording apparatus. In this state, for example, the ink cartridge and the head unit mounted to the carriage are connected via a tube, or the like, and the ink is supplied to the head unit from the ink cartridge.

EXAMPLES

Examples of the present invention are described together with Comparative Examples, which are provided for illustrative purposes only. The present invention is not limited by the following Examples and Comparative Examples.

Examples 1 to 24 and Comparative Examples 1 to 35

An ink composition (Tables 1 to 16) was stirred and then mixed. Thereafter, the mixture was filtered with a hydrophilic polytetrafluoroethylene (PTFE) type membrane filter having a pore diameter of 0.21 μm manufactured by ToyoRoshi Kaisha, Ltd. to produce each water-based ink and thereby obtained the water-based ink of Examples 1 to 24 and Comparative Examples 1 to 35. In the following Tables 1 to 16, the dyes (1-A) to (1-F) are compounds respectively represented by the chemical formulae (1-A) to (1-F), and the dyes (2-1A) to (2-1E) are compounds respectively represented by the chemical formulae (2-1A) to (2-1E).

With respect to the water-based ink of each Example and Comparative Example, (a) printing quality evaluation (bleeding), (b) ejection stability evaluation, (c) ozone resistance evaluation, (d) light resistance evaluation, (e) rubber deposition evaluation, (f) color development evaluation, and (g) comprehensive evaluation were carried out with the following method. Further, samples for (c) ozone resistance evaluation, (d) light resistance evaluation, and (f) color development evaluation were prepared as described below.

First, an ink cartridge was filled up with the water-based ink of each Example and Comparative Example. Next, the ink cartridge was attached to a digital multi-function center DCP-330C, which mounted an ink-jet printer, manufactured by Brother Industries, Ltd. Then, a gradation sample of the ink was printed on a glossy photo paper BP61GLA manufactured by Brother Industries, Ltd, and thereby obtained a patch having an initial Optical density (OD) value of 1.0. The OD value was measured by a spectrophotometer, Spectrolino, manufactured by Gretag-Macbeth (light source: $D_{65}$; observer: 2°; and status A).

(a) Printing Quality Evaluation (Bleeding)

Using the digital multi-function center DCP-330C on an office paper W manufactured by FUJITSU CoWorCo LIMITED, an evaluation sample was printed with the water-based ink of each Example and Comparative Example for background and with a water-based black ink contained in the ink cartridge LC10BK manufactured by Brother Industries, Ltd. for lines. Rag of border between the aforementioned water-based black ink and the water-based ink of each Example and Comparative Example was measured by a method according to ISO13660. In this state, the Rag is a raggedness of a line defined by ISO13660 and a ragged line indicates a state in which a line is rippled relative to an ideal line edge that supposed to be smooth and straight. From the obtained Rag, an evaluation was carried out according to the following Evaluation Criteria.

Printing Quality Evaluation (Bleeding) Criteria
A: Rag of line is less than 30
B: Rag of line is 30 or more and less than 40
C: Rag of line is 40 or more (b) Ejection Stability Evaluation Using the digital multi-function center DCP-330C on an office paper W manufactured by FUJITSU CoWorCo LIMITED, continuous printing of 100 million dots (approximately 30,000 sheets) was carried out. The result of the continuous printing was evaluated in accordance with the following Evaluation Criteria. The term "unejection" denotes the state where the nozzle of the ink-jet head is clogged and the water-based ink is not ejected. The term "ejection deflection" denotes the state where the nozzle of the ink-jet head is partially clogged and thereby the water-based ink is ejected not perpendicularly to the printing paper but obliquely thereto.

Ejection Stability Evaluation Criteria
A: Neither unejection nor ejection deflection occurred during the continuous printing, or slight unejection and/or ejection deflection occurred during the continuous printing but the unejection and/or ejection deflection was restored by five purges or fewer.
C: Unejection and ejection deflection occurred many times during the continuous printing and the unejection and ejection deflection were not restored by five purges.

(c) Ozone Resistance Evaluation

Using an ozone weather meter, OMS-H, manufactured by SUGA TEST INSTRUMENTS CO., LTD., the gradation sample was left for 40 hours under the following condition. That is, an ozone concentration of 2 ppm, a chamber temperature of 24° C. and a chamber relative humidity of 60%. Next, the OD value of the patch after leave was measured in the same manner as described above. Then, the OD value reduction rate (%) was obtained with the following formula (I) and the ozone resistance was evaluated according to the following Evaluation Criteria. The lower the OD value reduction rate is, the fewer the deterioration of the image, and it can be said that the water-based ink is good in the ozone resistance.

$$\text{OD value reduction rate}(\%) = ((X-Y)/X) \times 100 \qquad (I)$$

X: 1.0 (initial OD value)
Y: OD value after leave
Ozone Resistance Evaluation Criteria
A: OD value reduction rate is less than 20%
C: OD value reduction rate is 20% or more (d) Light Resistance Evaluation Using a high power energy xenon weather meter, SC750-WN, manufactured by SUGA TEST INSTRUMENTS CO., LTD., xenon lamp light was irradiated onto the gradation sample for 200 hours under the following condition. That is, a chamber temperature of 25° C., a chamber relative humidity of 50%, and an illuminance of 93 klx. Next, the OD value of the patch after irradiation was measured in the same manner as described above. Then, the OD value reduction rate (%) was obtained with the following formula (II) and the light resistance was evaluated according to the following Evaluation Criteria. The lower the OD value reduction rate is, the fewer the deterioration of the image, and it can be said that the water-based ink is good in the light resistance.

$$\text{OD value reduction rate}(\%) = ((X-Y)/X) \times 100 \qquad (II)$$

X: 1.0 (initial OD value)
Y: OD value after irradiation
Light Resistance Evaluation Criteria
A: OD value reduction rate is less than 30%
C: OD value reduction rate is 30% or more (e) Rubber Deposition Evaluation A rubber piece (ethylene-propylene rubber (EPDM); rubber hardness (measured by old JIS K 6301 A type) 40°) was soaked in 100 g of the water-based ink and stored for a week under an environment of 70° C. in a condition where a contact area of the rubber piece per gram of water-based ink is 30 $mm^2$. After storage, the rubber piece was taken out of the water-based ink. Then, the water-based ink in the container was filtrated with a hydrophilic polytetrafluoroethylene (PTFE) type membrane filter (with a pore diameter of 0.2 μm and a diameter of 15 mm) manufactured by ToyoRoshi Kaisha, Ltd. Further, the time required for filtration was measured. As a control, 100 g of the water-based ink before storage was filtrated under the same condition and the time required for filtration was measured. Next, an increase rate of filtration time was obtained with the following formula (III) and rubber deposition was evaluated according to the following Evaluation Criteria.

$$\text{Increase rate of filtration time} = Y/X \qquad (III)$$

X: Filtration time before storage
Y: Filtration time after storage
Rubber Deposition Evaluation Criteria
A: Increase rate of filtration time is less than 1.3 times
B: Increase rate of filtration time is 1.3 times or more and less than 1.6 times
C: Increase rate of filtration time is 1.6 times or more (f) Color Development Evaluation The gradation sample was visually observed and it was evaluated whether a magenta color is sufficiently expressed according to the following Evaluation Criteria.
Color Development Evaluation Criteria
A: Magenta color is sufficiently expressed.
B: Magenta color is expressed.
C: Magenta color is not expressed.

(g) Comprehensive Evaluation

With respect to the water-based ink of each Example and Comparative Example, from the results of (a) to (f), the comprehensive evaluation was carried out according to the following Evaluation Criteria.

Comprehensive Evaluation Criteria

AA: all evaluation results were "A"

A: "B" was found in one or more of the evaluation results but "C" was not found

C: "C" was found in one or more of the evaluation results

Figure 2:
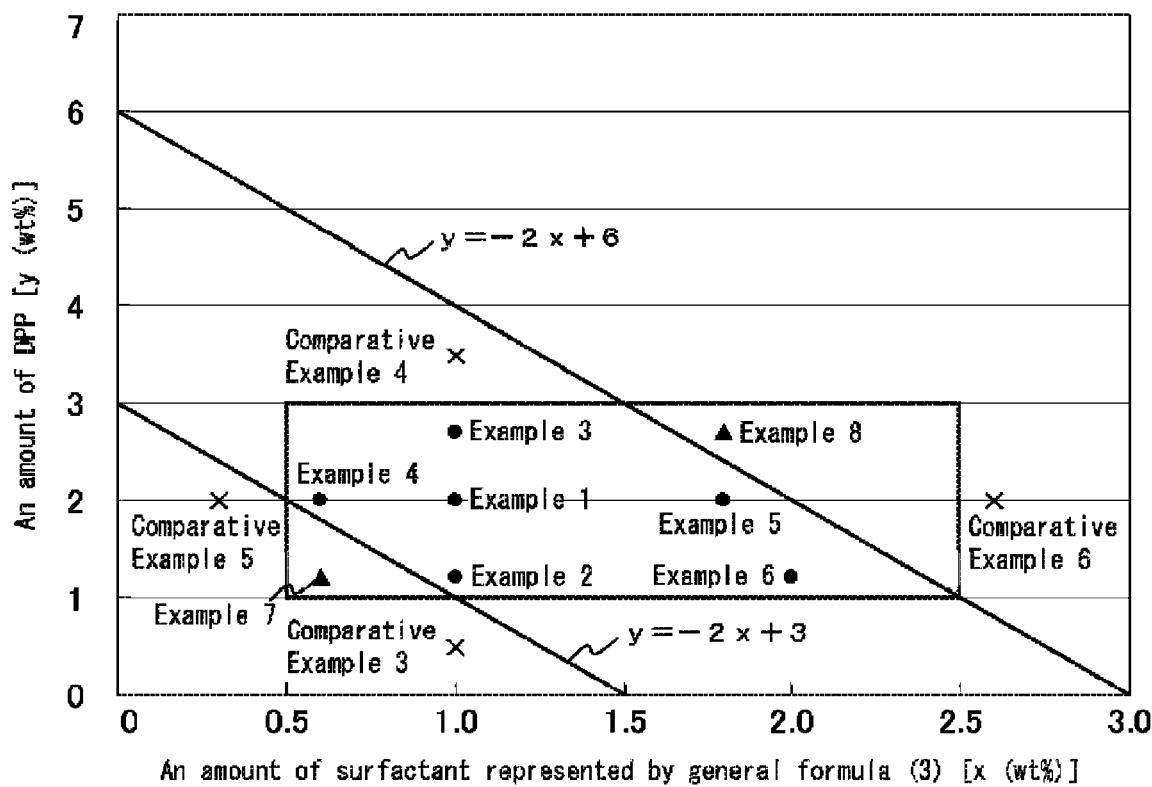
FIG. 2 is a graph indicating a relationship between an amount of surfactant represented by general formula (3) [x (wt %)] relative to the total amount of ink and an amount of dipropylene glycol propyl ether [y (wt %)] relative to a total amount of ink in Examples 1 to 8 and Comparative Examples 3 to 6.
Figure 3:
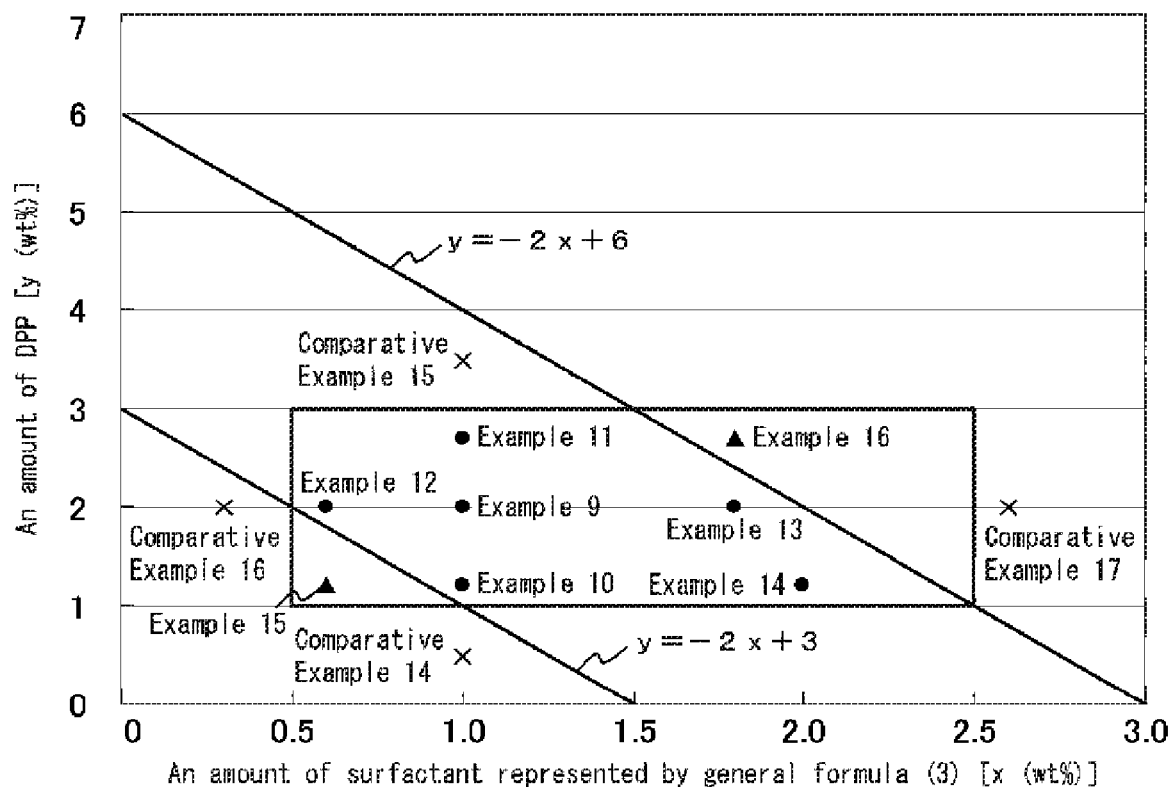
FIG. 3 is a graph indicating a relationship between an amount of surfactant represented by general formula (3) [x (wt %)] relative to the total amount of ink and an amount of dipropylene glycol propyl ether [y (wt %)] relative to a total amount of ink in Examples 9 to 16 and Comparative Examples 14 to 17.
Figure 4:
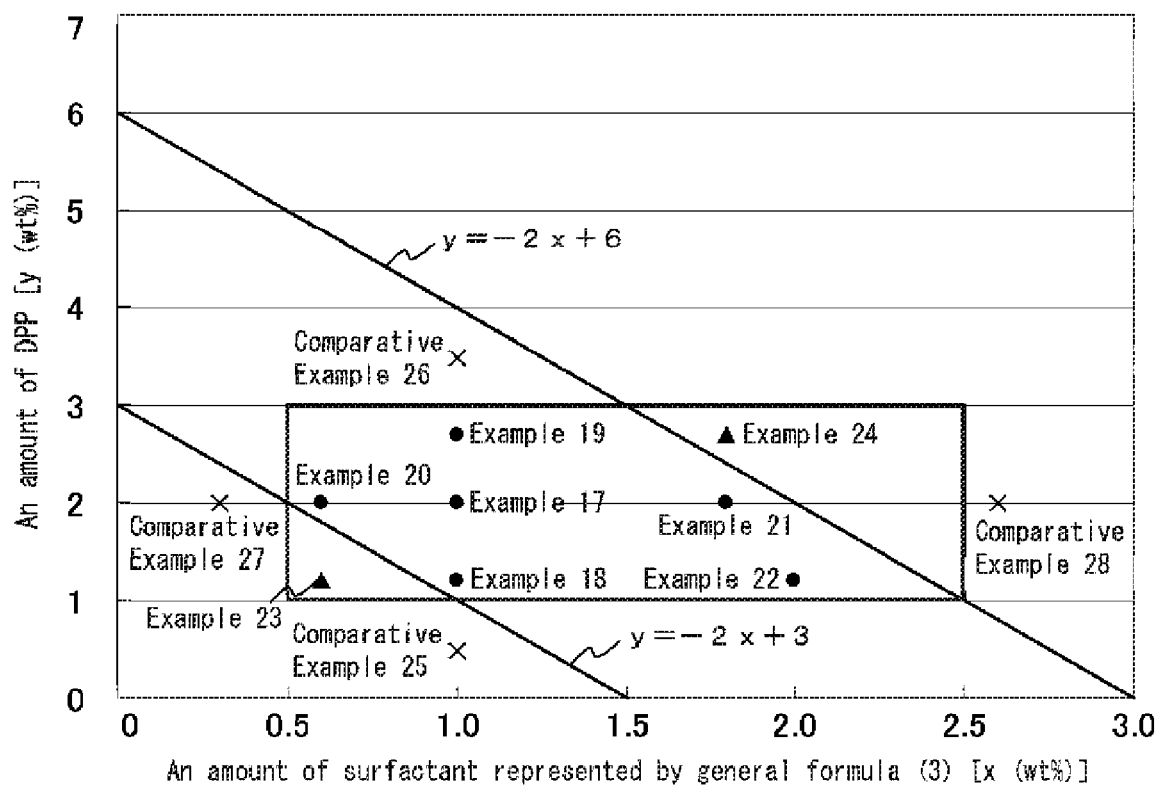
FIG. 4 is a graph indicating a relationship between an amount of surfactant represented by general formula (3) [x (wt %)] relative to the total amount of ink and an amount of dipropylene glycol propyl ether [y (wt %)] relative to a total amount of ink in Examples 17 to 24 and Comparative Examples 25 to 28.

Ink compositions and evaluation results of the water-based ink of each Example are summarized in Tables 1 to 6. Further, ink compositions and evaluation results of the water-based ink of each Comparative Example are summarized in Tables 7 to 16. A relationship between an amount of surfactant represented by general formula (3) [x (wt %)] relative to a total amount of ink and an amount of DPP [y (wt %)] relative to a total amount of ink in Examples 1 to 8 and Comparative Examples 3 to 6 is shown in FIG. 2. A relationship between an amount of surfactant represented by general formula (3) [x (wt %)] relative to a total amount of ink and an amount of DPP [y (wt %)] relative to a total amount of ink in Examples 9 to 16 and Comparative Examples 14 to 17 is shown in FIG. 3. A relationship between an amount of surfactant represented by general formula (3) [x (wt %)] relative to a total amount of ink and an amount of DPP [y (wt %)] relative to a total amount of ink in Examples 17 to 24 and Comparative Examples 25 to 28 is shown in FIG. 4.

TABLE 1

|  | Example 1 | Example 2 | Example 3 | Example 4 |
|---|---|---|---|---|
| INK COMPOSITION (wt %) | | | | |
| dye(1) | | | | |
| dye(1-A) | 2.25 | — | — | — |
| dye(1-B) | — | 4.05 | — | — |
| dye(1-C) | — | — | 2.80 | — |
| dye(1-D) | — | — | — | 2.80 |
| dye(2) | | | | |
| dye(2-1A) | 0.25 | — | — | — |
| dye(2-1B) | — | 0.45 | — | — |
| dye(2-1C) | — | — | 0.70 | — |
| dye(2-1D) | — | — | — | 0.70 |
| Dipropylene glycol propyl ether | 2.00 | 1.20 | 2.70 | 2.00 |
| OLFIN ® E1010 (1*) | 1.00 | 1.00 | 1.00 | 0.60 |
| Glycerin | 25.00 | 25.00 | 25.00 | 25.00 |
| Water | Balance | Balance | Balance | Balance |
| Total amount of dyes (wt %) | 2.50 | 4.50 | 3.50 | 3.50 |
| Weight ratio of dyes (dye(1):dye(2)) | 9:1 | 9:1 | 8:2 | 8:2 |
| EVALUATION | | | | |
| Printing Quality Evaluation (Bleeding) | A | A | A | A |
| Ejection Stability Evaluation | A | A | A | A |
| Ozone Resistance Evaluation | A | A | A | A |
| Light Resistance Evaluation | A | A | A | A |
| Rubber Deposition Evaluation | A | A | A | A |
| Color Development Evaluation | A | A | A | A |
| Comprehensive Evaluation | AA | AA | AA | AA |

(1*) surfactant represented by general formula (3) (ethylene oxide (10 mol) additive of acethylene diol) manufactured by Nissin Chemical Industry Co., Ltd

TABLE 2

|  | Example 5 | Example 6 | Example 7 | Example 8 |
|---|---|---|---|---|
| INK COMPOSITION (wt %) | | | | |
| dye(1) | | | | |
| dye(1-A) | — | — | — | 2.80 |
| dye(1-E) | 1.75 | — | 2.80 | — |
| dye(1-F) | — | 3.15 | — | — |
| dye(2) | | | | |
| dye(2-1A) | — | 1.35 | — | 0.70 |
| dye(2-1E) | 0.75 | — | 0.70 | — |
| Dipropylene glycol propyl ether | 2.00 | 1.20 | 1.20 | 2.70 |
| OLFIN ® E1010 (1*) | 1.80 | 2.00 | 0.60 | 1.80 |
| Glycerin | 25.00 | 25.00 | 25.00 | 25.00 |
| Water | Balance | Balance | Balance | Balance |
| Total amount of dyes (wt %) | 2.50 | 4.50 | 3.50 | 3.50 |
| Weight ratio of dyes (dye(1):dye(2)) | 7:3 | 7:3 | 8:2 | 8:2 |
| EVALUATION | | | | |
| Printing Quality Evaluation (Bleeding) | A | A | B | A |
| Ejection Stability Evaluation | A | A | A | A |
| Ozone Resistance Evaluation | A | A | A | A |
| Light Resistance Evaluation | A | A | A | A |
| Rubber Deposition Evaluation | A | A | A | B |
| Color Development Evaluation | A | A | A | A |
| Comprehensive Evaluation | AA | AA | A | A |

(1*) surfactant represented by general formula (3) (ethylene oxide (10 mol) additive of acethylene diol) manufactured by Nissin Chemical Industry Co., Ltd

TABLE 3

|  | Example 9 | Example 10 | Example 11 | Example 12 |
|---|---|---|---|---|
| INK COMPOSITION (wt %) | | | | |
| dye(1) | | | | |
| dye(1-A) | 2.25 | — | — | — |
| dye(1-B) | — | 4.05 | — | — |
| dye(1-C) | — | — | 2.80 | — |
| dye(1-D) | — | — | — | 2.80 |
| dye(2) | | | | |
| C.I. Acid Red 52 | 0.25 | 0.45 | 0.70 | 0.70 |
| Dipropylene glycol propyl ether | 2.00 | 1.20 | 2.70 | 2.00 |
| OLFIN ® E1010 (1*) | 1.00 | 1.00 | 1.00 | 0.60 |
| Glycerin | 25.00 | 25.00 | 25.00 | 25.00 |
| Water | Balance | Balance | Balance | Balance |
| Total amount of dyes (wt %) | 2.50 | 4.50 | 3.50 | 3.50 |
| Weight ratio of dyes (dye(1):dye(2)) | 9:1 | 9:1 | 8:2 | 8:2 |
| EVALUATION | | | | |
| Printing Quality Evaluation (Bleeding) | A | A | A | A |
| Ejection Stability Evaluation | A | A | A | A |
| Ozone Resistance Evaluation | A | A | A | A |
| Light Resistance Evaluation | A | A | A | A |
| Rubber Deposition Evaluation | A | A | A | A |

TABLE 3-continued

|  | Example 9 | Example 10 | Example 11 | Example 12 |
|---|---|---|---|---|
| Color Development Evaluation | A | A | A | A |
| Comprehensive Evaluation | AA | AA | AA | AA |

(1*) surfactant represented by general formula (3) (ethylene oxide (10 mol) additive of acethylene diol) manufactured by Nissin Chemical Industry Co., Ltd

TABLE 4

|  | Example 13 | Example 14 | Example 15 | Example 16 |
|---|---|---|---|---|
| INK COMPOSITION (wt %) |  |  |  |  |
| dye(1) |  |  |  |  |
| dye(1-A) | — | — | — | 2.80 |
| dye(1-E) | 1.75 | — | 2.80 | — |
| dye(1-F) | — | 3.15 | — | — |
| dye(2) |  |  |  |  |
| C.I. Acid Red 52 | 0.75 | 1.35 | 0.70 | 0.70 |
| Dipropylene glycol propyl ether | 2.00 | 1.20 | 1.20 | 2.70 |
| OLFIN ® E1010 (1*) | 1.80 | 2.00 | 0.60 | 1.80 |
| Glycerin | 25.00 | 25.00 | 25.00 | 25.00 |
| Water | Balance | Balance | Balance | Balance |
| Total amount of dyes (wt %) | 2.50 | 4.50 | 3.50 | 3.50 |
| Weight ratio of dyes (dye(1):dye(2)) | 7:3 | 7:3 | 8:2 | 8:2 |
| EVALUATION |  |  |  |  |
| Printing Quality Evaluation (Bleeding) | A | A | B | A |
| Ejection Stability Evaluation | A | A | A | A |
| Ozone Resistance Evaluation | A | A | A | A |
| Light Resistance Evaluation | A | A | A | A |
| Rubber Deposition Evaluation | A | A | A | B |
| Color Development Evaluation | A | A | A | A |
| Comprehensive Evaluation | AA | AA | A | A |

(1*) surfactant represented by general formula (3) (ethylene oxide (10 mol) additive of acethylene diol) manufactured by Nissin Chemical Industry Co., Ltd

TABLE 5

|  | Example 17 | Example 18 | Example 19 | Example 20 |
|---|---|---|---|---|
| INK COMPOSITION (wt %) |  |  |  |  |
| dye(1) |  |  |  |  |
| dye(1-A) | 2.25 | — | — | — |
| dye(1-B) | — | 4.05 | — | — |
| dye(1-C) | — | — | 2.80 | — |
| dye(1-D) | — | — | — | 2.80 |
| dye(2) |  |  |  |  |
| C.I. Acid Red 289 | 0.25 | 0.45 | 0.70 | 0.70 |
| Dipropylene glycol propyl ether | 2.00 | 1.20 | 2.70 | 2.00 |
| OLFIN ® E1010 (1*) | 1.00 | 1.00 | 1.00 | 0.60 |
| Glycerin | 25.00 | 25.00 | 25.00 | 25.00 |
| Water | Balance | Balance | Balance | Balance |
| Total amount of dyes (wt %) | 2.50 | 4.50 | 3.50 | 3.50 |
| Weight ratio of dyes (dye(1):dye(2)) | 9:1 | 9:1 | 8:2 | 8:2 |
| EVALUATION |  |  |  |  |
| Printing Quality Evaluation (Bleeding) | A | A | A | A |
| Ejection Stability Evaluation | A | A | A | A |
| Ozone Resistance Evaluation | A | A | A | A |
| Light Resistance Evaluation | A | A | A | A |
| Rubber Deposition Evaluation | A | A | A | A |
| Color Development Evaluation | A | A | A | A |
| Comprehensive Evaluation | AA | AA | AA | AA |

(1*) surfactant represented by general formula (3) (ethylene oxide (10 mol) additive of acethylene diol) manufactured by Nissin Chemical Industry Co., Ltd

TABLE 6

|  | Example 21 | Example 22 | Example 23 | Example 24 |
|---|---|---|---|---|
| INK COMPOSITION (wt %) |  |  |  |  |
| dye(1) |  |  |  |  |
| dye(1-A) | — | — | — | 2.80 |
| dye(1-E) | 1.75 | — | 2.80 | — |
| dye(1-F) | — | 3.15 | — | — |
| dye(2) |  |  |  |  |
| C.I. Acid Red 289 | 0.75 | 1.35 | 0.70 | 0.70 |
| Dipropylene glycol propyl ether | 2.00 | 1.20 | 1.20 | 2.70 |
| OLFIN ® E1010 (1*) | 1.80 | 2.00 | 0.60 | 1.80 |
| Glycerin | 25.00 | 25.00 | 25.00 | 25.00 |
| Water | Balance | Balance | Balance | Balance |
| Total amount of dyes (wt %) | 2.50 | 4.50 | 3.50 | 3.50 |
| Weight ratio of dyes (dye(1):dye(2)) | 7:3 | 7:3 | 8:2 | 8:2 |
| EVALUATION |  |  |  |  |
| Printing Quality Evaluation (Bleeding) | A | A | B | A |
| Ejection Stability Evaluation | A | A | A | A |
| Ozone Resistance Evaluation | A | A | A | A |
| Light Resistance Evaluation | A | A | A | A |
| Rubber Deposition Evaluation | A | A | A | B |
| Color Development Evaluation | A | A | A | A |
| Comprehensive Evaluation | AA | AA | A | A |

(1*) surfactant represented by general formula (3) (ethylene oxide (10 mol) additive of acethylene diol) manufactured by Nissin Chemical Industry Co., Ltd

TABLE 7

|  | Comparative Example 1 | Comparative Example 2 | Comparative Example 3 | Comparative Example 4 |
|---|---|---|---|---|
| INK COMPOSITION (wt %) | | | | |
| dye(1) | | | | |
| dye(1-A) | — | 2.10 | 2.80 | — |
| dye(1-B) | — | — | — | 2.80 |
| dye(2) | | | | |
| dye(2-1A) | — | 1.40 | 0.70 | — |
| dye(2-1B) | — | — | — | 0.70 |
| dye(2-1E) | 3.50 | — | — | — |
| Dipropylene glycol propyl ether | 2.00 | 2.00 | 0.50 | 3.50 |
| OLFIN ® E1010 (1*) | 1.00 | 1.00 | 1.00 | 1.00 |
| Glycerin | 25.00 | 25.00 | 25.00 | 25.00 |
| Water | Balance | Balance | Balance | Balance |
| Total amount of dyes (wt %) | 3.50 | 3.50 | 3.50 | 3.50 |
| Weight ratio of dyes (dye(1):dye(2)) | 0:10 | 6:4 | 8:2 | 8:2 |
| EVALUATION | | | | |
| Printing Quality Evaluation (Bleeding) | A | A | C | A |
| Ejection Stability Evaluation | A | A | A | C |
| Ozone Resistance Evaluation | C | C | A | A |
| Light Resistance Evaluation | C | C | A | A |
| Rubber Deposition Evaluation | A | A | A | A |
| Color Development Evaluation | A | A | A | A |
| Comprehensive Evaluation | C | C | C | C |

(1*) surfactant represented by general formula (3) (ethylene oxide (10 mol) additive of acethylene diol) manufactured by Nissin Chemical Industry Co., Ltd

TABLE 8

|  | Comparative Example 5 | Comparative Example 6 | Comparative Example 7 | Comparative Example 8 |
|---|---|---|---|---|
| INK COMPOSITION (wt %) | | | | |
| dye(1) | | | | |
| dye(1-B) | — | — | 2.80 | — |
| dye(1-C) | 2.80 | — | — | 2.80 |
| dye(1-D) | — | 2.80 | — | — |
| dye(2) | | | | |
| dye(2-1B) | — | — | 0.70 | — |
| dye(2-1C) | 0.70 | — | — | 0.70 |
| dye(2-1D) | — | 0.70 | — | — |
| Dipropylene glycol propyl ether | 2.00 | 2.00 | — | — |
| Dipropylene glycol methyl ether | — | — | 2.00 | — |
| Dipropylene glycol butyl ether | — | — | — | 2.00 |
| OLFIN ® E1010 (1*) | 0.30 | 2.60 | 1.00 | 1.00 |
| Glycerin | 25.00 | 25.00 | 25.00 | 25.00 |
| Water | Balance | Balance | Balance | Balance |
| Total amount of dyes (wt %) | 3.50 | 3.50 | 3.50 | 3.50 |
| Weight ratio of dyes (dye(1):dye(2)) | 8:2 | 8:2 | 8:2 | 8:2 |
| EVALUATION | | | | |
| Printing Quality Evaluation (Bleeding) | C | A | C | A |
| Ejection Stability Evaluation | A | A | A | A |

TABLE 8-continued

|  | Comparative Example 5 | Comparative Example 6 | Comparative Example 7 | Comparative Example 8 |
|---|---|---|---|---|
| Ozone Resistance Evaluation | A | A | A | A |
| Light Resistance Evaluation | A | A | A | A |
| Rubber Deposition Evaluation | A | C | A | C |
| Color Development Evaluation | A | A | A | A |
| Comprehensive Evaluation | C | C | C | C |

(1*) surfactant represented by general formula (3) (ethylene oxide (10 mol) additive of acethylene diol) manufactured by Nissin Chemical Industry Co., Ltd

TABLE 9

|  | Comparative Example 9 | Comparative Example 10 | Comparative Example 11 |
|---|---|---|---|
| INK COMPOSITION (wt %) |  |  |  |
| dye(1) |  |  |  |
| dye(1-C) | — | 0.80 | — |
| dye(1-D) | 2.80 | — | 4.80 |
| dye(2) |  |  |  |
| dye(2-1A) | — | — | — |
| dye(2-1B) | — | — | — |
| dye(2-1C) | — | 0.20 | — |
| dye(2-1D) | 0.70 | — | 1.20 |
| dye(2-1E) | — | — | — |
| Dipropylene glycol propyl ether | — | 2.00 | 2.00 |
| Propylene glycol propyl ether | 2.00 | — | — |
| OLFIN ® E1010 (1*) | 1.00 | 1.00 | 1.00 |
| Glycerin | 25.00 | 25.00 | 25.00 |
| Water | Balance | Balance | Balance |
| Total amount of dyes (wt %) | 3.50 | 1.00 | 6.00 |
| Weight ratio of dyes (dye(1):dye(2)) | 8:2 | 8:2 | 8:2 |
| EVALUATION |  |  |  |
| Printing Quality Evaluation (Bleeding) | A | A | A |
| Ejection Stability Evaluation | A | A | A |
| Ozone Resistance Evaluation | A | A | A |
| Light Resistance Evaluation | A | A | A |
| Rubber Deposition Evaluation | C | A | A |
| Color Development Evaluation | A | C | C |
| Comprehensive Evaluation | C | C | C |

(1*) surfactant represented by general formula (3) (ethylene oxide (10 mol) additive of acethylene diol) manufactured by Nissin Chemical Industry Co., Ltd

TABLE 10

|  | Comparative Example 12 | Comparative Example 13 | Comparative Example 14 | Comparative Example 15 |
|---|---|---|---|---|
| INK COMPOSITION (wt %) |  |  |  |  |
| dye(1) |  |  |  |  |
| dye(1-A) | — | 2.10 | 2.80 | — |
| dye(1-B) | — | — | — | 2.80 |
| dye(2) |  |  |  |  |
| C.I. Acid Red 52 | 3.50 | 1.40 | 0.70 | 0.70 |
| Dipropylene glycol propyl ether | 2.00 | 2.00 | 0.50 | 3.50 |
| OLFIN ® E1010 (1*) | 1.00 | 1.00 | 1.00 | 1.00 |
| Glycerin | 25.00 | 25.00 | 25.00 | 25.00 |
| Water | Balance | Balance | Balance | Balance |
| Total amount of dyes (wt %) | 3.50 | 3.50 | 3.50 | 3.50 |
| Weight ratio of dyes (dye(1):dye(2)) | 0:10 | 6:4 | 8:2 | 8:2 |
| EVALUATION |  |  |  |  |
| Printing Quality Evaluation (Bleeding) | A | A | C | A |
| Ejection Stability Evaluation | A | A | A | C |
| Ozone Resistance Evaluation | C | C | A | A |
| Light Resistance Evaluation | C | C | A | A |

TABLE 10-continued

|  | Comparative Example 12 | Comparative Example 13 | Comparative Example 14 | Comparative Example 15 |
|---|---|---|---|---|
| Rubber Deposition Evaluation | A | A | A | A |
| Color Development Evaluation | A | A | A | A |
| Comprehensive Evaluation | C | C | C | C |

(1*) surfactant represented by general formula (3) (ethylene oxide (10 mol) additive of acethylene diol) manufactured by Nissin Chemical Industry Co., Ltd

TABLE 11

|  | Comparative Example 16 | Comparative Example 17 | Comparative Example 18 | Comparative Example 19 |
|---|---|---|---|---|
| INK COMPOSITION (wt %) | | | | |
| dye(1) | | | | |
| dye(1-B) | — | — | 2.80 | — |
| dye(1-C) | 2.80 | — | — | 2.80 |
| dye(1-D) | — | 2.80 | — | — |
| dye(2) | | | | |
| C.I. Acid Red 52 | 0.70 | 0.70 | 0.70 | 0.70 |
| Dipropylene glycol propyl ether | 2.00 | 2.00 | — | — |
| Dipropylene glycol methyl ether | — | — | 2.00 | — |
| Dipropylene glycol butyl ether | — | — | — | 2.00 |
| OLFIN ® E1010 (1*) | 0.30 | 2.60 | 1.00 | 1.00 |
| Glycerin | 25.00 | 25.00 | 25.00 | 25.00 |
| Water | Balance | Balance | Balance | Balance |
| Total amount of dyes (wt %) | 3.50 | 3.50 | 3.50 | 3.50 |
| Weight ratio of dyes (dye(1):dye(2)) | 8:2 | 8:2 | 8:2 | 8:2 |
| EVALUATION | | | | |
| Printing Quality Evaluation (Bleeding) | C | A | C | A |
| Ejection Stability Evaluation | A | A | A | A |
| Ozone Resistance Evaluation | A | A | A | A |
| Light Resistance Evaluation | A | A | A | A |
| Rubber Deposition Evaluation | A | C | A | C |
| Color Development Evaluation | A | A | A | A |
| Comprehensive Evaluation | C | C | C | C |

(1*) surfactant represented by general formula (3) (ethylene oxide (10 mol) additive of acethylene diol) manufactured by Nissin Chemical Industry Co., Ltd

TABLE 12

|  | Comparative Example 20 | Comparative Example 21 | Comparative Example 22 |
|---|---|---|---|
| INK COMPOSITION (wt %) | | | |
| dye(1) | | | |
| dye(1-C) | — | 0.80 | — |
| dye(1-D) | 2.80 | — | 4.80 |
| dye(2) | | | |
| C.I. Acid Red 52 | 0.70 | 0.20 | 1.20 |
| Dipropylene glycol propyl ether | — | 2.00 | 2.00 |
| Propylene glycol propyl ether | 2.00 | — | — |
| OLFIN ® E1010 (1*) | 1.00 | 1.00 | 1.00 |
| Glycerin | 25.00 | 25.00 | 25.00 |
| Water | Balance | Balance | Balance |
| Total amount of dyes (wt %) | 3.50 | 1.00 | 6.00 |
| Weight ratio of dyes (dye(1):dye(2)) | 8:2 | 8:2 | 8:2 |
| EVALUATION | | | |
| Printing Quality Evaluation (Bleeding) | A | A | A |
| Ejection Stability Evaluation | A | A | A |

TABLE 12-continued

|  | Comparative Example 20 | Comparative Example 21 | Comparative Example 22 |
|---|---|---|---|
| Ozone Resistance Evaluation | A | A | A |
| Light Resistance Evaluation | A | A | A |
| Rubber Deposition Evaluation | C | A | A |
| Color Development Evaluation | A | C | C |
| Comprehensive Evaluation | C | C | C |

(1*) surfactant represented by general formula (3) (ethylene oxide (10 mol) additive of acethylene diol) manufactured by Nissin Chemical Industry Co., Ltd

TABLE 13

|  | Comparative Example 23 | Comparative Example 24 | Comparative Example 25 | Comparative Example 26 |
|---|---|---|---|---|
| INK COMPOSITION (wt %) | | | | |
| dye(1) | | | | |
| dye(1-A) | — | 2.10 | 2.80 | — |
| dye(1-B) | — | — | — | 2.80 |
| dye(2) | | | | |
| C.I. Acid Red 289 | 3.50 | 1.40 | 0.70 | 0.70 |
| Dipropylene glycol propyl ether | 2.00 | 2.00 | 0.50 | 3.50 |
| OLFIN ® E1010 (1*) | 1.00 | 1.00 | 1.00 | 1.00 |
| Glycerin | 25.00 | 25.00 | 25.00 | 25.00 |
| Water | Balance | Balance | Balance | Balance |
| Total amount of dyes (wt %) | 3.50 | 3.50 | 3.50 | 3.50 |
| Weight ratio of dyes (dye(1):dye(2)) | 0:10 | 6:4 | 8:2 | 8:2 |
| EVALUATION | | | | |
| Printing Quality Evaluation (Bleeding) | A | A | C | A |
| Ejection Stability Evaluation | A | A | A | C |
| Ozone Resistance Evaluation | C | C | A | A |
| Light Resistance Evaluation | C | C | A | A |
| Rubber Deposition Evaluation | A | A | A | A |
| Color Development Evaluation | A | A | A | A |
| Comprehensive Evaluation | C | C | C | C |

(1*) surfactant represented by general formula (3) (ethylene oxide (10 mol) additive of acethylene diol) manufactured by Nissin Chemical Industry Co., Ltd

TABLE 14

|  | Comparative Example 27 | Comparative Example 28 | Comparative Example 29 | Comparative Example 30 |
|---|---|---|---|---|
| INK COMPOSITION (wt %) | | | | |
| dye(1) | | | | |
| dye(1-B) | — | — | 2.80 | — |
| dye(1-C) | 2.80 | — | — | 2.80 |
| dye(1-D) | — | 2.80 | — | — |
| dye(2) | | | | |
| C.I. Acid Red 289 | 0.70 | 0.70 | 0.70 | 0.70 |
| Dipropylene glycol propyl ether | 2.00 | 2.00 | — | — |
| Dipropylene glycol methyl ether | — | — | 2.00 | — |
| Dipropylene glycol butyl ether | — | — | — | 2.00 |
| OLFIN ® E1010 (1*) | 0.30 | 2.60 | 1.00 | 1.00 |
| Glycerin | 25.00 | 25.00 | 25.00 | 25.00 |
| Water | Balance | Balance | Balance | Balance |
| Total amount of dyes (wt %) | 3.50 | 3.50 | 3.50 | 3.50 |

TABLE 14-continued

|  | Comparative Example 27 | Comparative Example 28 | Comparative Example 29 | Comparative Example 30 |
|---|---|---|---|---|
| Weight ratio of dyes (dye(1):dye(2)) | 8:2 | 8:2 | 8:2 | 8:2 |
| EVALUATION |  |  |  |  |
| Printing Quality Evaluation (Bleeding) | C | A | C | A |
| Ejection Stability Evaluation | A | A | A | A |
| Ozone Resistance Evaluation | A | A | A | A |
| Light Resistance Evaluation | A | A | A | A |
| Rubber Deposition Evaluation | A | C | A | C |
| Color Development Evaluation | A | A | A | A |
| Comprehensive Evaluation | C | C | C | C |

(1*) surfactant represented by general formula (3) (ethylene oxide (10 mol) additive of acethylene diol) manufactured by Nissin Chemical Industry Co., Ltd

TABLE 15

|  | Comparative Example 31 | Comparative Example 32 | Comparative Example 33 |
|---|---|---|---|
| INK COMPOSITION (wt %) |  |  |  |
| dye(1) |  |  |  |
| dye(1-C) | — | 0.80 | — |
| dye(1-D) | 2.80 | — | 4.80 |
| dye(2) |  |  |  |
| C.I. Acid Red 289 | 0.70 | 0.20 | 1.20 |
| Dipropylene glycol propyl ether | — | 2.00 | 2.00 |
| Propylene glycol propyl ether | 2.00 | — | — |
| OLFIN ® E1010 (1*) | 1.00 | 1.00 | 1.00 |
| Glycerin | 25.00 | 25.00 | 25.00 |
| Water | Balance | Balance | Balance |
| Total amount of dyes (wt %) | 3.50 | 1.00 | 6.00 |
| Weight ratio of dyes (dye(1):dye(2)) | 8:2 | 8:2 | 8:2 |
| EVALUATION |  |  |  |
| Printing Quality Evaluation (Bleeding) | A | A | A |
| Ejection Stability Evaluation | A | A | A |
| Ozone Resistance Evaluation | A | A | A |
| Light Resistance Evaluation | A | A | A |
| Rubber Deposition Evaluation | C | A | A |
| Color Development Evaluation | A | C | C |
| Comprehensive Evaluation | C | C | C |

(1*) surfactant represented by general formula (3) (ethylene oxide (10 mol) additive of acethylene diol) manufactured by Nissin Chemical Industry Co., Ltd

TABLE 16

|  | Comparative Example 34 | Comparative Example 35 |
|---|---|---|
| INK COMPOSITION (wt %) |  |  |
| dye(1) |  |  |
| dye(1-A) | — | 2.80 |
| dye(1-E) | 2.80 | — |
| dye |  |  |
| C.I. Acid Red 14 | 0.70 | — |
| C.I. Direct Red 227 | — | 0.70 |
| Dipropylene glycol propyl ether | 0.50 | 0.50 |
| OLFIN ® E1010 (1*) | 0.50 | 0.50 |
| Glycerin | 25.00 | 25.00 |
| Water | Balance | Balance |
| Total blending amount of dyes (% by weight) | 3.50 | 3.50 |
| Weight ratio of dyes (dye(1):dye(2)) | — | — |
| EVALUATION |  |  |
| Printing Quality Evaluation (Bleeding) | A | A |
| Ejection Stability Evaluation | A | A |
| Ozone Resistance Evaluation | C | C |
| Light Resistance Evaluation | C | C |
| Rubber Deposition Evaluation | A | A |
| Color Development Evaluation | B | B |
| Comprehensive Evaluation | C | C |

(1*) surfactant represented by general formula (3) (ethylene oxide (10 mol) additive of acethylene diol) manufactured by Nissin Chemical Industry Co., Ltd Examples 1 to 8 and Comparative Examples 1 to 11

Using Dye Having Free Acid that is Represented by the General Formula (2-1) as Dye (2)

As summarized in Tables 1 and 2, each water-based ink of Examples 1 to 6 was good in all results of the printing quality evaluation (bleeding), the ejection stability evaluation, the ozone resistance evaluation, the light resistance evaluation, the rubber deposition evaluation, and the color development evaluation. The water-based ink of Example 7 that satisfies y<−2x+3 was slightly inferior in the result of the printing quality evaluation (bleeding) as compared to water-based inks of Examples 1 to 6, however was a reasonable level in practical use. Further, the water-based ink of Example 8 that satisfies y>−2x+6 was slightly inferior in the result of the rubber deposition evaluation as compared to water-based inks of Examples 1 to 6, however was a reasonable level in practical use. In contrast, as summarized in Tables 7 to 9, the water-based ink of Comparative Example 1 that does not comprise dye (1) was inferior in the results of the ozone resistance evaluation, and the light resistance evaluation. The water-based ink of Comparative Example 2, in which the dye (1):dye (2) [weight ratio]=6:4, was inferior in the results of the ozone resistance evaluation, and the light resistance evaluation. The water-based ink of Comparative Example 3 that satisfies y<1 was inferior in the result of the printing quality evaluation (bleeding). The water-based ink of Comparative Example 4 that satisfies y>3 was inferior in the result of the ejection stability evaluation. The water-based ink of Comparative Example 5 that satisfies x<0.5 was inferior in the result of the printing quality evaluation (bleeding). The water-based ink of Comparative Example 6 that satisfies x>2.5 was inferior in the result of the rubber deposition evaluation. The water-based ink of Comparative Example 7 that does not comprise DPP was inferior in the result of the printing quality evaluation (bleeding) due to dipropylene glycol methyl ether added to the water base ink instead of the DPP. Each water-based ink of Comparative Examples 8 and 9 that does not comprise DPP was inferior in the result of the rubber deposition evaluation due to dipropylene glycol butyl ether or propylene glycol propyl ether added to the water-based ink instead of the DPP. As for the water-based ink of Comparative Example 10 with a little quantity of blending of dyes in total, printing was too light and was inferior in the result of the color development evaluation. As for the water-based ink of Comparative Example 11 with a large quantity of blending of dyes in total, printing was too deep and was inferior in the result of the color development evaluation.

Examples 9 to 16 and Comparative Examples 12 to 22

Using C. I. Acid Red 52 as Dye (2)

As summarized in Tables 3 and 4, each water-based ink of Examples 9 to 14 was good in all results of the printing quality evaluation (bleeding), the ejection stability evaluation, the ozone resistance evaluation, the light resistance evaluation, the rubber deposition evaluation, and the color development evaluation. The water-based ink of Example 15 that satisfies y<−2x+3 was slightly inferior in the result of the printing quality evaluation (bleeding) as compared to water-based inks of Examples 9 to 14, however was a reasonable level in practical use. Further, the water-based ink of Example 16 that satisfies y>−2x+6 was slightly inferior in the result of the rubber deposition evaluation as compared to water-based inks of Examples 9 to 14, however was a reasonable level in practical use. In contrast, as summarized in Tables 10 to 12, the water-based ink of Comparative Example 12 that does not comprise dye (1) was inferior in the results of the ozone resistance evaluation, and the light resistance evaluation. The water-based ink of Comparative Example 13, in which the dye (1):dye (2) [weight ratio]=6:4, was inferior in the results of the ozone resistance evaluation, and the light resistance evaluation. The water-based ink of Comparative Example 14 that satisfies y<1 was inferior in the result of the printing quality evaluation (bleeding). The water-based ink of Comparative Example 15 that satisfies y>3 was inferior in the result of the ejection stability evaluation. The water-based ink of Comparative Example 16 that satisfies x<0.5 was inferior in the result of the printing quality evaluation (bleeding). The water-based ink of Comparative Example 17 that satisfies x>2.5 was inferior in the result of the rubber deposition evaluation. The water-based ink of Comparative Example 18 that does not comprise DPP was inferior in the result of the printing quality evaluation (bleeding) due to dipropylene glycol methyl ether added to the water-based ink instead of the DPP. Each water-based ink of Comparative Examples 19 and 20 that does not comprise DPP was inferior in the result of the rubber deposition evaluation due to dipropylene glycol butyl ether or propylene glycol propyl ether added to the water-based ink instead of the DPP. As for the water-based ink of Comparative Example 21 with a little quantity of blending of dyes in total, printing was too light and was inferior in the result of the color development evaluation. As for the water-based ink of Comparative Example 22 with a large quantity of blending of dyes in total, printing was too deep and was inferior in the result of the color development evaluation.

Examples 17 to 24 and Comparative Examples 23 to 33

Using C. I. Acid Red 289 as Dye (2)

As summarized in Tables 5 and 6, each water-based ink of Examples 17 to 22 was good in all results of the printing quality evaluation (bleeding), the ejection stability evaluation, the ozone resistance evaluation, the light resistance evaluation, the rubber deposition evaluation, and the color development evaluation. The water-based ink of Example 23 that satisfies y<−2x+3 was slightly inferior in the result of the printing quality evaluation (bleeding) as compared to water-based inks of Examples 17 to 22, however was a reasonable level in practical use. Further, the water-based ink of Example 24 that satisfies y>−2x+6 was slightly inferior in the result of the rubber deposition evaluation as compared to water-based inks of Examples 17 to 22, however was a reasonable level in practical use. In contrast, as summarized in Tables 13 to 15, the water-based ink of Comparative Example 23 that does not comprise dye (1) was inferior in the results of the ozone resistance evaluation, and the light resistance evaluation. The water-based ink of Comparative Example 24, in which the dye (1):dye (2) [weight ratio]=6:4, was inferior in the results of the ozone resistance evaluation, and the light resistance evaluation. The water-based ink of Comparative Example 25 that satisfies y<1 was inferior in the result of the printing quality evaluation (bleeding). The water-based ink of Comparative Example 26 that satisfies y>3 was inferior in the result of the ejection stability evaluation. The water-based ink of Comparative Example 27 that satisfies x<0.5 was inferior in the result of the printing quality evaluation (bleeding). The water-based ink of Comparative Example 28 that satisfies x>2.5 was inferior in the result of the rubber deposition evaluation. The water-based ink of Comparative Example 29 that does not comprise DPP was inferior in the result of the printing quality evaluation (bleeding) due to dipropylene glycol methyl ether added to the water-based ink instead of the DPP. Each water-based ink of Comparative Examples 30 and 31 that does not comprise DPP was inferior in the result of the rubber deposition evaluation due to dipropylene glycol butyl ether or propylene glycol propyl ether added to the water-based ink instead of the DPP. As for the water-based ink of Comparative Example 32 with a little quantity of blending of dyes in total, printing was too light and was inferior in the result of the color development evaluation. As for the water-based ink of Comparative Example 33 with a large quantity of blending of dyes in total, printing was too deep and was inferior in the result of the color development evaluation.

Comparative Examples 34 and 35

The water-based ink of Comparative Example 34 using C. I. Acid Red 14 instead of dye (2) and the water-based ink of Comparative Example 35 using C. I. Direct Red 227 instead of dye (2) were inferior in the results of the ozone resistance evaluation, and the light resistance evaluation.

It will be obvious to those having skill in the art that many changes may be made in the above-described details of the particular aspects described herein without departing from the spirit or scope of the invention as defined in the appended claims.

What is claimed is:

1. A water-based ink for inkjet recording comprising a coloring agent, water, a water-soluble organic solvent, and an acetylene glycol surfactant, wherein the coloring agent comprises the following dye (1) and dye (2), the water-soluble organic solvent comprises dipropylene glycol propyl ether, the acetylene glycol surfactant comprises a surfactant represented by the following general formula (3), and wherein the dye (1), the dye (2), the dipropylene glycol propyl ether, and the surfactant represented by the following general formula (3) are blended so as to satisfy the following conditions (A) to (D), respectively:

Dye (1): dye represented by the following general formula (1)

Dye (2): at least one dye selected from the group consisting of a dye having free acid that is represented by the following general formula (2-1), C. I. Acid Red 52, and C. I. Acid Red 289

(A) a total amount of the dye (1) and the dye (2) relative to a total amount of the ink is in the range of about 2 wt % to about 5 wt %

(B) a weight ratio between the dye (1) and the dye (2) in the ink is in the range of about 9:1 to about 7:3

(C) an amount of surfactant represented by general formula (3) relative to a total amount of the ink is in the range of 0.5 wt % to about 2.5 wt %

(D) an amount of dipropylene glycol propyl ether relative to a total amount of the ink is in the range of about 1 wt % to about 3 wt %

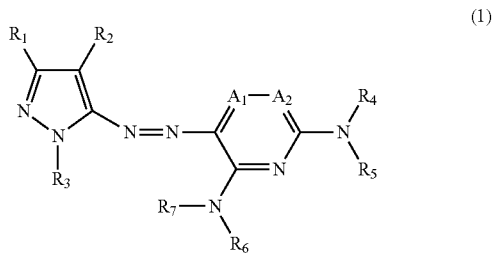

wherein in the general formula (1), $R_1$ represents a hydrogen atom, a substituted or unsubstituted alkyl group, or a substituted or unsubstituted aryl group;

$R_2$ represents a hydrogen atom, a halogen atom, or a cyano group;

$R_3$ represents a hydrogen atom, a substituted or unsubstituted alkyl group, a substituted or unsubstituted aryl group, or a substituted or unsubstituted heterocyclic group;

$R_4$, $R_5$, $R_6$, and $R_7$, each independently, represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, provided that $R_4$, $R_5$, $R_6$, and $R_7$ may be the same or different, that $R_4$ and $R_5$ are not simultaneously hydrogen atoms, and that $R_6$ and $R_7$ are not simultaneously hydrogen atoms; and $A_1$ and $A_2$ are both substituted or unsubstituted carbon atoms, or one of $A_1$ and $A_2$ is a substituted or unsubstituted carbon atom and the other is a nitrogen atom:

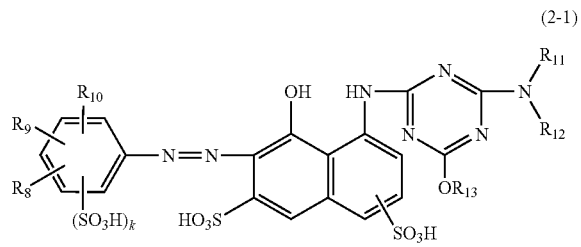

wherein in the general formula (2-1), $R_8$, $R_9$ and $R_{10}$, each independently, represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonate ester group, a substituted or unsubstituted alkylsulfonyl group, a substituted or unsubstituted arylsulfonyl group, a carboxyl group, or a carboxylate ester group, provided that $R_8$, $R_9$, and $R_{10}$ may be the same or different;

k represents a number of 0, 1 or 2;

$R_{11}$, $R_{12}$ and $R_{13}$, each independently, represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group, provided that $R_{11}$, $R_{12}$, and $R_{13}$ may be the same or different:

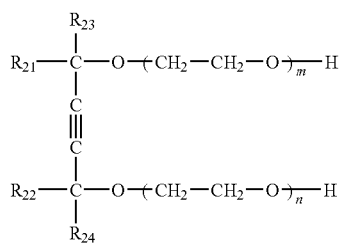

(3)

wherein in the general formula (3), m and n may be the same or different and indicate numbers that satisfy m+n=1 to 15; and $R_{21}$, $R_{22}$, $R_{23}$, and $R_{24}$ may be the same or different and are straight chain or branched-chain alkyl groups having 1 to 5 carbon atoms.

2. The water-based ink according to claim 1, wherein the dipropylene glycol propyl ether and the surfactant represented by the general formula (3) are blended so as to satisfy the following condition (E), respectively:

$$y \geq -2x+3 \text{ and } y \leq -2x+6 \quad \text{(E)}$$

x: an amount of surfactant represented by general formula (3) relative to a total amount of the ink (wt %)

y: an amount of dipropylene glycol propyl ether relative to a total amount of the ink (wt %).

3. The water-based ink according to claim 1, wherein the ink is a water-based magenta ink.

4. The water-based ink according to claim 1, wherein the dye (1) comprises at least one compound selected from the group consisting of compounds represented by the following chemical formulae (1-A) to (1-F):

(1-A)

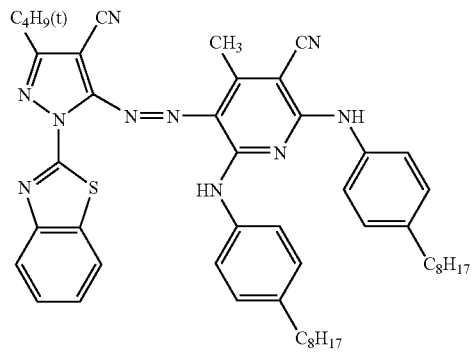

(1-B)

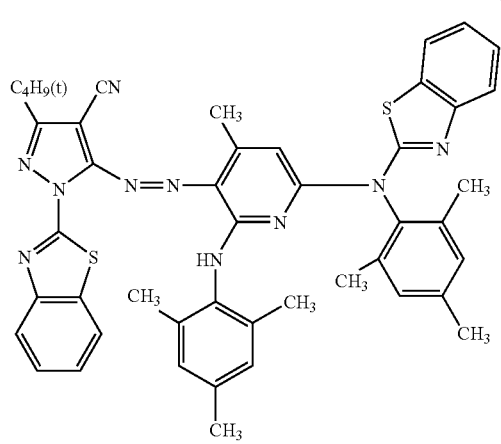

(1-C)

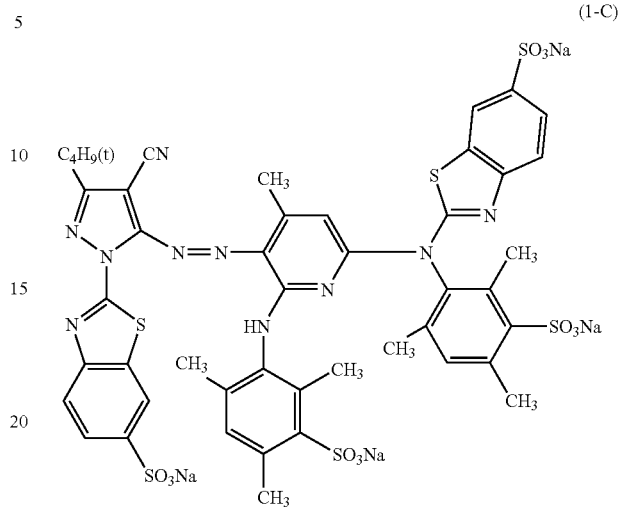

(1-D)

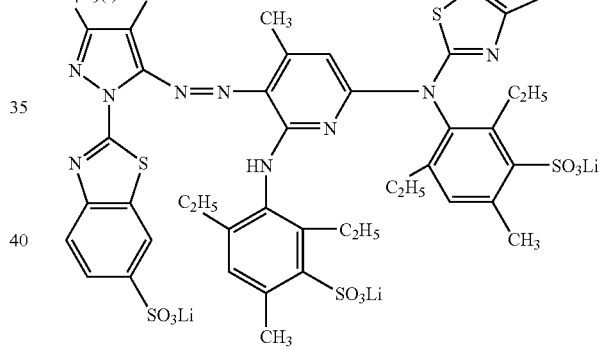

(1-E)

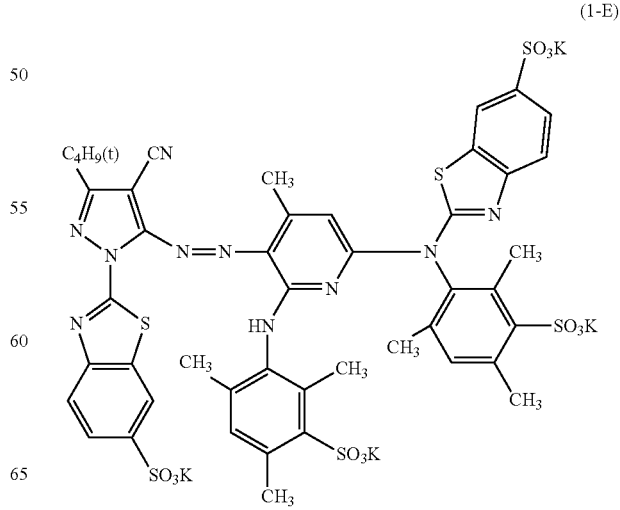

-continued (1-F)
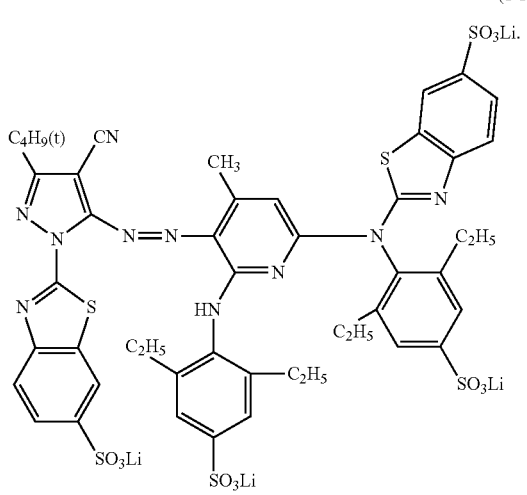

5. The water-based ink according to claim 1, wherein an amount of the dye (1) relative to a total amount of the ink is in a range of about 1.4 wt % to about 4.5 wt %.

6. The water-based ink according to claim 1, wherein the dye having free acid that is represented by the general formula (2-1) comprises at least one compound selected from the group consisting of compounds represented by the following chemical formulae (2-1A) to (2-1E):

(2-1A)

(2-1B)

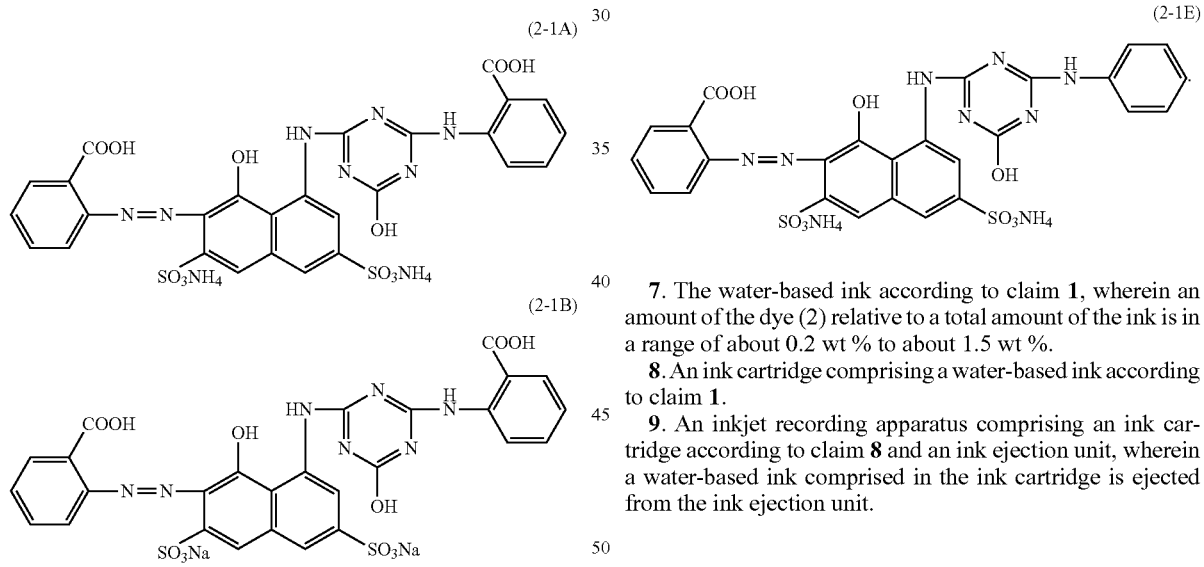

-continued (2-1C)

(2-1D)

(2-1E)

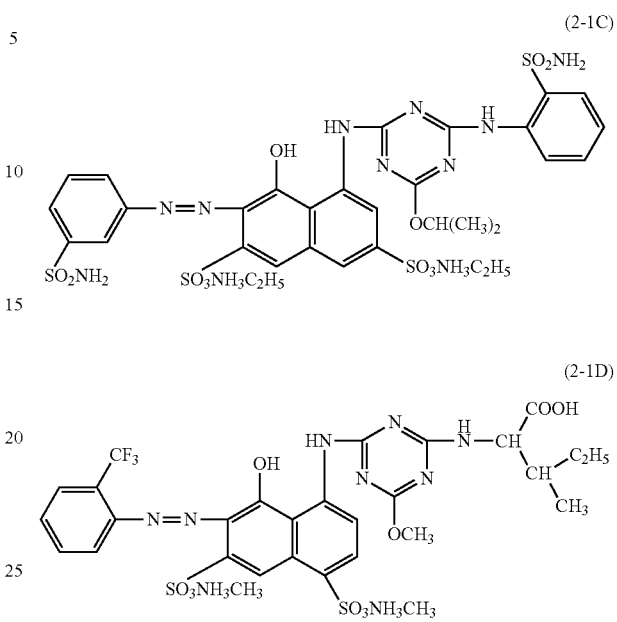

7. The water-based ink according to claim 1, wherein an amount of the dye (2) relative to a total amount of the ink is in a range of about 0.2 wt % to about 1.5 wt %.

8. An ink cartridge comprising a water-based ink according to claim 1.

9. An inkjet recording apparatus comprising an ink cartridge according to claim 8 and an ink ejection unit, wherein a water-based ink comprised in the ink cartridge is ejected from the ink ejection unit.

* * * * *

UNITED STATES PATENT AND TRADEMARK OFFICE
CERTIFICATE OF CORRECTION

PATENT NO. : 8,021,470 B2  
APPLICATION NO. : 12/342940  
DATED : September 20, 2011  
INVENTOR(S) : Akihiko Taniguchi et al.

Page 1 of 1

It is certified that error appears in the above-identified patent and that said Letters Patent is hereby corrected as shown below:

In Column 39, Claim 6, Lines 40-50:
Please replace Formula 2-1B, as it appears:

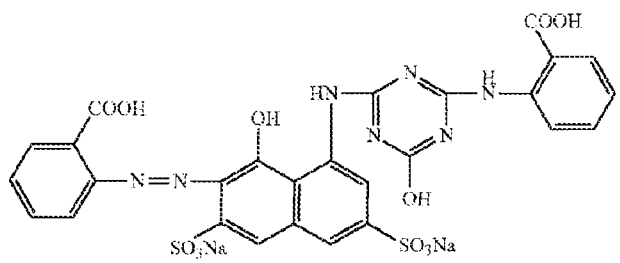

With the following corrected formula:

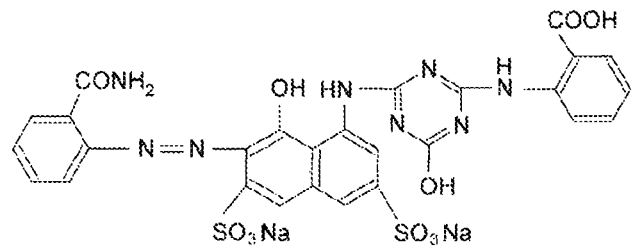

Signed and Sealed this
Twenty-seventh Day of March, 2012

David J. Kappos
*Director of the United States Patent and Trademark Office*